(12) United States Patent
Nicholls

(10) Patent No.: US 11,032,255 B2
(45) Date of Patent: *Jun. 8, 2021

(54) SECURE COMPARISON OF INFORMATION

(71) Applicant: OpenEye Scientific Software, Inc., Santa Fe, NM (US)

(72) Inventor: Anthony Nicholls, Boston, MA (US)

(73) Assignee: OpenEye Scientific, Inc., Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,403

(22) Filed: Apr. 8, 2019

(65) Prior Publication Data

US 2020/0084191 A1 Mar. 12, 2020

Related U.S. Application Data

(63) Continuation of application No. 15/332,515, filed on Oct. 24, 2016, now Pat. No. 10,257,173, which is a
(Continued)

(51) Int. Cl.
*H04L 29/06* (2006.01)
*H04L 9/30* (2006.01)
(Continued)

(52) U.S. Cl.
CPC ........ *H04L 63/0478* (2013.01); *H04L 9/0825* (2013.01); *H04L 9/30* (2013.01);
(Continued)

(58) Field of Classification Search
None
See application file for complete search history.

(56) References Cited

U.S. PATENT DOCUMENTS

| | | | |
|---|---|---|---|
| 5,274,707 A | 12/1993 | Schlafly | |
| 5,297,208 A | 3/1994 | Schlafly et al. | |

(Continued)

FOREIGN PATENT DOCUMENTS

| | | |
|---|---|---|
| WO | 1999048243 A1 | 9/1999 |
| WO | 2017070674 A1 | 4/2017 |

OTHER PUBLICATIONS

International Search Report and Written Opinion from International Application No. PCT/US2016/058473 dated Mar. 20, 2017, application now published as International Publication No. WO2017/070674 on Apr. 27, 2017.

(Continued)

*Primary Examiner* — Benjamin E Lanier
(74) *Attorney, Agent, or Firm* — Womble Bond Dickinson (US) LLP

(57) ABSTRACT

The technology encompasses new uses of already-known cryptographic techniques. The technology entails computer-based methods of sharing information securely, in particular an asymmetric method of secure computation that relies on the private-key/public key paradigm with homomorphic encryption. The methods and programmed computing apparatuses herein apply mathematical concepts to services or tasks that are commercially useful and that have not hitherto been possible. Applications of the methods within cloud computing paradigms are presented. Applications of the methods and apparatus herein are far-ranging and include, but are not limited to: purchase-sale transactions such as real estate or automobiles, where some aspect of price negotiation is expected; stock markets; legal settlements; salary negotiation; auctions, and other types of complex financial transactions.

17 Claims, 22 Drawing Sheets

Related U.S. Application Data continuation-in-part of application No. 14/920,728, filed on Oct. 22, 2015, now Pat. No. 10,248,800.

(60) Provisional application No. 62/067,373, filed on Oct. 22, 2014.

(51) Int. Cl.
 H04L 9/08 (2006.01)
 H04L 9/32 (2006.01)
 H04L 9/00 (2006.01)

(52) U.S. Cl.
 CPC ............ *H04L 9/3236* (2013.01); *H04L 9/008* (2013.01); *H04L 9/302* (2013.01); *H04L 9/3218* (2013.01); *H04L 2209/20* (2013.01)

(56) References Cited

U.S. PATENT DOCUMENTS

| | | |
|---|---|---|
| 5,373,560 A | 12/1994 | Schlafly |
| 10,248,800 B2 | 4/2019 | Nicholls |
| 10,257,173 B2 | 4/2019 | Nicholls |
| 2008/0285747 A1 | 11/2008 | Kim et al. |
| 2010/0106959 A1 | 4/2010 | Haran et al. |
| 2011/0071947 A1 | 3/2011 | Muthukrishnan et al. |
| 2015/0295712 A1 | 10/2015 | Veugen |
| 2017/0039377 A1 | 2/2017 | Nicholls |

OTHER PUBLICATIONS

Shimon Even, et al., "A randomized protocol for signing contracts", Communications of the ACM, Association for Computing Machinery, Inc., vol. 28, No. 6, pp. 637-647 (1985).

Non-Final Action in U.S. Appl. No. 14/920,728, 6 pages (dated Jul. 5, 2018).

PCT International Preliminary Report on Patentability for PCT Application No. PCT/US2016/058473, 10 pages (dated Apr. 24, 2018).

Single Bit Bid:
A's Number is Bigger than or Equal to B's Number

A=12
(1 1 1 1 1 1 1 1 1 1 1 1 0 0 0 0)

B=9
(0 0 0 0 0 0 0 0 1 0 0 0 0 0 0 0)

⊗

A XOR B
(1 1 1 1 1 1 1 1 0 1 1 1 0 0 0 0)

‖

Scrambled A XOR B
(1 0 1 0 1 1 1 0 1 1 1 0 1 0 1 1)

▽ N = 11 = Number of 1s

Single Bit Bid:
A's Number is Smaller than B's Number

A=12
(1 1 1 1 1 1 1 1 1 1 1 1 0 0 0 0)

B=14
(0 0 0 0 0 0 0 0 0 0 0 0 0 1 0 0)

⊗

A XOR B
(1 1 1 1 1 1 1 1 1 1 1 1 0 1 0 0)

‖

Scrambled A XOR B
(1 0 1 1 1 1 1 0 1 1 1 0 1 1 1 1)

▽ N = 13 = Number of 1s

GEL: A's Number is Bigger than B's Number

A=12
(1 1 1 1 1 1 1 1 1 1 1 1 0 0 0 0)

B=10
(0 0 0 0 0 0 0 0 0 1 1 0 0 0 0 0)

A XOR B
(1 1 1 1 1 1 1 1 1 0 0 1 0 0 0 0)

Scrambled A XOR B
(1 0 1 0 1 1 0 0 1 1 1 0 1 0 1 1)

N= 10 = Number of 1s

12 > N Therefore A > B

GEL: A's Number is Equal to B's Number

A=12
(1 1 1 1 1 1 1 1 1 1 1 1 0 0 0 0)

B=12
(0 0 0 0 0 0 0 0 0 0 0 1 1 0 0 0)

A XOR B
(1 1 1 1 1 1 1 1 1 1 1 0 1 0 0 0)

Scrambled A XOR B
(1 0 1 1 1 1 0 0 1 1 1 0 1 1 1 1)

N= 12 = Number of 1s

12 > N Therefore A = B

GEL: A's Number is Less than B's Number

A=12
(1  1  1  1  1  1  1  1  1  1  1  1  0  0  0  0)

B=15 
(0  0  0  0  0  0  0  0  0  0  0  0  0  0  1  1)

A XOR B 
(1  1  1  1  1  1  1  1  1  1  1  1  0  0  1  1)

Scrambled A XOR B 
(1  1  1  1  1  1  0  1  1  1  1  0  1  1  1  1)

▽ N= 14 = Number of 1s

12 > N Therefore A < B

GEL Range: Do Our Ranges Overlap?

A=(7-12)=6 bits set
(0  0  0  0  0  0  1  1  1  1  1  1  0  0  0  0)

B=(12-15) 
(0  0  0  0  0  0  0  0  0  0  0  1  0  0  1  0)

A XOR B 
(0  0  0  0  0  0  1  1  1  1  1  0  0  0  1  0)

Scrambled A XOR B 
(0  0  1  1  0  0  0  1  0  1  1  0  0  0  0  1)

▽ N= 6 = Number of 1s

6 = 6 Therefore Ranges Overlap

GEL Range: Do Our Ranges Overlap?

A=(7-12)= 6 bits set
(0 0 0 0 0 0 1 1 1 1 1 1 0 0 0 0)

B=(14-15) 
(0 0 0 0 0 0 0 0 0 0 0 0 0 1 1 0)

A XOR B 
(0 0 0 0 0 0 1 1 1 1 1 1 0 1 1 0)

Scrambled A XOR B 
(0 0 1 1 0 1 0 1 0 1 1 0 1 0 0 1)

N= 8 = Number of 1s

6 < 8 Therefore Ranges Do Not Overlap

GEL Range: Do Our Ranges Overlap?

A=(7-12)= 6 bits set
(0 0 0 0 0 0 1 1 1 1 1 1 0 0 0 0)

B=(8-10) 
(0 0 0 0 0 0 0 1 0 1 0 0 0 0 0 0)

A XOR B 
(0 0 0 0 0 0 1 0 1 0 1 1 0 0 0 0)

Scrambled A XOR B 
(0 0 1 1 0 0 0 1 0 0 1 0 0 0 0 0)

N= 4 = Number of 1s

6 > 4 Therefore Ranges Are Enclosed (12)

(13)

(14)

SECURE COMPARISON OF INFORMATION

CLAIM OF PRIORITY

This application is a Continuation Application of U.S. patent application Ser. No. 15/332,515, filed Oct. 24, 2016, which is continuation-in-part of patent application Ser. No. 14/920,728, filed Oct. 22, 2015, now allowed, which claims the benefit of priority under 35 U.S.C. § 119(e) to U.S. provisional application Ser. No. 62/067,373, filed Oct. 22, 2014, which are incorporated herein by reference in their entirety.

TECHNICAL FIELD

The technology described herein generally relates to methods of sharing information securely, and more particularly relates to an asymmetric method of secure computation that relies on the private-key/public key paradigm with homomorphic encryption.

BACKGROUND

In many aspects of commerce and life it would be an advantage for two or more parties to compare what they know without actually revealing that information to one another. As an example, suppose you and your neighbor want to see who earns more money: can you do this without revealing anything about your salaries? There are many other such examples. Suppose you want to buy a house but the owner has not listed a price. Can you tell if the most you are willing to offer is more than the least the owner is willing to accept without telling the owner anything more about what you will pay and without the owner revealing anything other than that what they will accept is less than the most you will pay?

Suppose a sports team wishes to trade players with another team. Can the two teams first determine if they have any matches, i.e., players the first team would let go and that the second team would like to hire, without disclosing any player names?

Suppose two parties want to bid (once) on something but neither wants to lose "first mover advantage", i.e., if one bids first, the other can offer just a minimal amount more and win the bidding process. Without recourse to any third party can the two parties share bids (electronically) without having either gain such an advantage?

In the field of chemistry, if two parties have sets of molecules of known composition, can either of the parties tell (a) whether any of the molecules are the same, or (b) how similar the two collections might be, without revealing any additional information about what the molecules actually are? For instance, two companies might want to compare their respective collections, for example for the purpose of enriching both by trading compounds, but without revealing what they actually have outside of those to be traded. In another scenario, a small biotechnology company has made some compounds that are active against a disease that it wants to license to a large pharmaceutical company: once the larger company sees the biotechnology company's compounds they might just go make them themselves. Even if the biotechnology company has applied for patent protection, the large company may have enough resources to work around it. Could the smaller company convince the large company that these compounds are quite different from any they have in-house without revealing the identity of their own compounds?

In another variant on this situation, suppose a company knows a series of properties for each molecule in its dataset, e.g., the activity against a standard series of kinases. Can the company examine another company's collection and discover molecules that have a similar profile but with different chemical composition, without either side revealing either their molecules or their kinase profiles? Or vice versa: can the first company find molecules in the second company's collection that are chemically similar to those of interest in its own dataset, but have radically different kinase profiles?

Finally, much effort is made within the pharmaceutical industry to build predictive models based on measured or calculated properties of known molecules. Can such models be shared with others outside the company without revealing either the molecules or their measured properties? Can two companies combine their data to build a model they could both use that is better than either could make individually, again without any release of primary, i.e., molecular structure data?

Accordingly, there is a need for a method of permitting two parties to a transaction to share proprietary data securely in a way that only reveals sufficient information for each party to decide whether to move forward with the transaction, and doesn't compromise either parties' data.

The discussion of the background herein is included to explain the context of the technology. This is not to be taken as an admission that any of the material referred to was published, known, or part of the common general knowledge as at the priority date of any of the claims found appended hereto.

Throughout the description and claims of the instant application, the word "comprise" and variations thereof, such as "comprising" and "comprises", is not intended to exclude other additives, components, integers or steps.

SUMMARY

The instant disclosure addresses the secure sharing of Information, between two or multiple parties. In particular, the disclosure comprises a computer-based method for sharing information securely. The disclosure further comprises an apparatus for carrying out a secure sharing of information. The apparatus and process of the present disclosure are particularly applicable to negotiated transactions.

The present disclosure provides for any of the methods described herein, including those expressed as claims appended hereto, and for apparatus for performing the same, as well as for computer-readable media encoded with instructions for carrying out the same.

BRIEF DESCRIPTION OF THE DRAWINGS

FIGS. 3A and 3B show how asymmetric secure comparison is applied to a bidding situation involving a single number for buyer and seller.

FIG. 7A shows a method of generating a shared matrix of similarities (dissimilarities).

Like reference symbols in the various drawings indicate like elements. To reduce clutter and improve clarity, reference symbols in the figures may be used herein within parentheses, e.g., (123), without any implied change in meaning.

DETAILED DESCRIPTION

Figure 1:
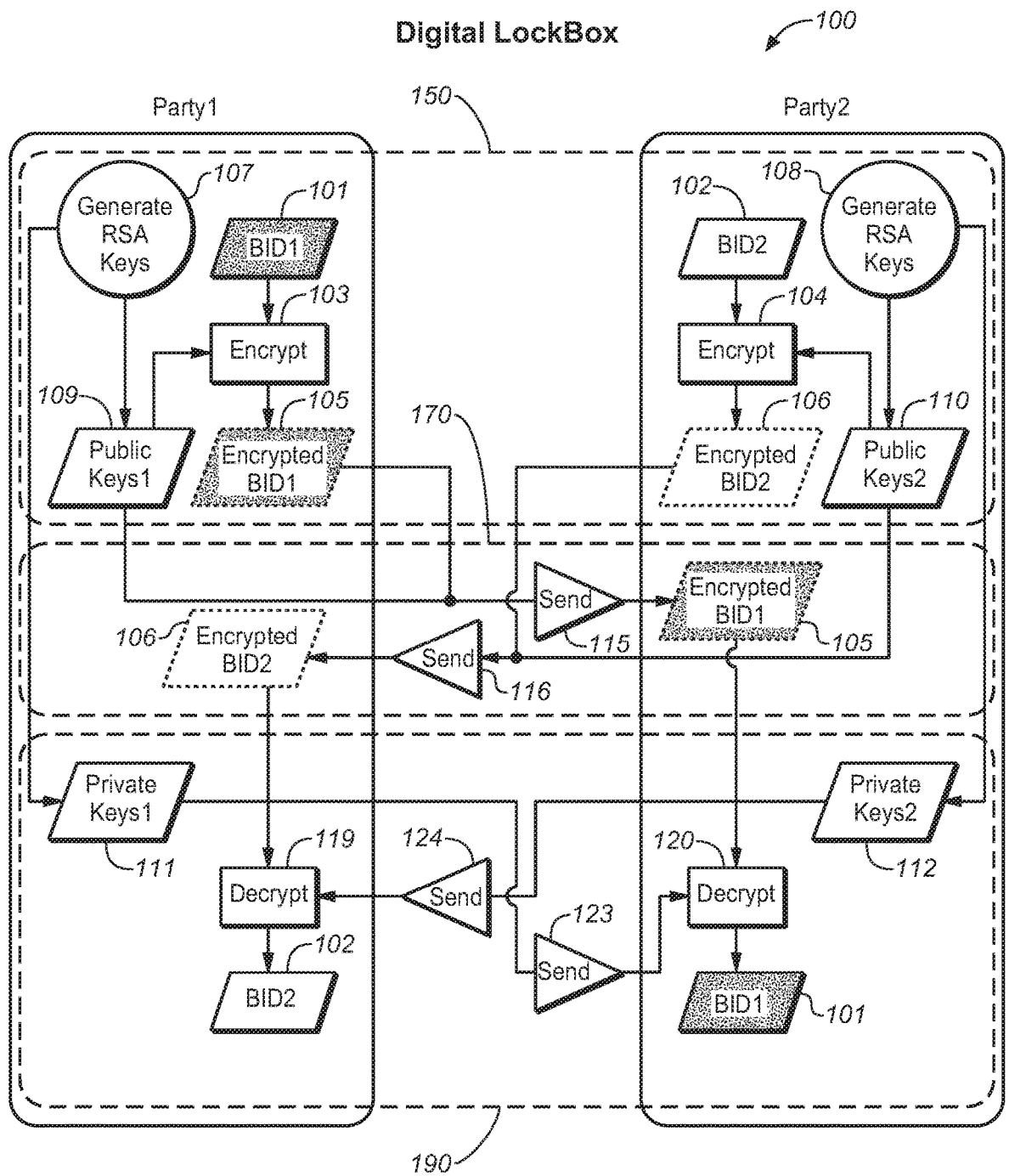
FIG. 1 shows a method for managing simultaneous bidding involving an example of a "digital lockbox" relying on, for example, the difficulty of prime number factorization.

The problem of secure comparison of information, and related problems, can be solved by the application of number theory, a branch of mathematics once considered of little practical value! For instance, the example of safeguarding a personal identification number (PIN) can be solved by what is known as "Zero Knowledge Proofs" (ZKP). A ZKP allows one party to prove to another that it knows a number "X" without revealing what "X" is. Other, more complicated, examples can be addressed by the techniques described herein. All are "provably secure", in the sense that the only way a second party can actually discover a first party's hidden information is by some computational process that can be proven to be beyond mortal resources.

Two examples of number theory that are of great importance to the modern world and, in fact, that underlie much of modern cryptography, are the Discrete Logarithm Problem (DLP) and Prime Number Factorization (PNF). As they play a role in the instant methods for comparing information, including chemical structures, they are briefly described in the following sections.

Discrete Logarithm Problem

Suppose we have a relationship, as expressed in equation (1):

$$g^x = y (\bmod N) \qquad (1)$$

where N is a prime number and mod means "modular", or "clock" arithmetic, i.e., numbers greater than or equal to N are reduced by an integer multiple of N such that the remainder lies from 0 to N−1. A value g, called a "generator", can be found such that if x ranges from 1 to N−1, $g^x$ will reproduce these same integers but in a different order. For example, suppose N=5, then:

$$2^1 : 2 = 2 (\bmod N) \qquad (2a)$$

$$2^2 : 4 = 4 (\bmod N) \qquad (2b)$$

$$2^3 : 8 = 3 (\bmod N) \qquad (2c)$$

$$2^4 : 16 = 1 (\bmod N) \qquad (2d)$$

As shown in equations (2a-d), the number "2" is a generator for the prime number "5".

Now suppose N is a very big prime number, for example, 200 or more digits long, and suppose y is known, i.e., the right hand side (RHS) of Equation (1). Is it possible to work backwards to get a valid x? That is, given (N, g, y) can we calculate x? If y is small enough, we might be tempted to just plug in some values of x, see if we get a value larger or smaller than y and adjust x accordingly. If x is very small this might work. However, if x were chosen randomly from 1 to N−1, there is a very small chance this would ever be true (of the order of 1 in $10^{200}$ !). Mostly likely y is also a 200-digit number and there is no practical way to search all $10^{200}$ numbers to see which one produces it. There is also no known algorithm to make this search feasible. If the quantities involved were not 'discrete' (i.e., integers that obey modular arithmetic), the solution would be as in equation (3):

$$x = \frac{\log(y)}{\log(g)} \qquad (3)$$

Hence, this is called the "Discrete Logarithm Problem" (DLP) and is believed to be computationally 'hard', by which is meant the problem gets exponentially harder with the number of digits of the numbers involved, as opposed to polynomially harder: i.e., if y has 200 digits, the problem is not twice as hard (linear) or four times as hard (quadratic) as when y has 100-digits, but is $10^{100}$ times (exponentially) harder.

DLP underlies digital signatures and all secure internet communication. It was also the basis of what is known as the Diffie-Hellman key exchange (see, e.g., http://en.wikipedia.org/wiki/Diffie %E2%80%93Hellman_key_exchange#Cryptographic_explanation): can two parties publically transmit data to each other and yet still generate a secret number (a "key") that they can then use to send encrypted messages to each other. It was the beginning of truly secure communication protocols.

Prime Number Factorization

Suppose a problem is expressed by equation (4):

$$N = p * q \qquad (4)$$

where p and q are large prime numbers. Given N (a non-prime number), is it possible to find p and q? Just as with DLP, this problem is believed to be computationally hard, i.e., the difficulty scales exponentially with the number of digits of N. Approaches are known that can factor such numbers in less time than expected, but only if relatively simple safeguards are ignored in choosing p and q (for instance, p should not be too close to q). The difficulty of this problem underlies RSA cryptography. In short, it can be shown that (equation (5)):

$$m^{n(p-1)(q-1)+1} = m (\bmod N) \qquad (5)$$

where m and n are any integers, holds.

Suppose there are two numbers, e and d, such that:

$$e*d = n(p-1)(q-1)+1 \quad (6)$$

i.e., $$e*d = 1(\mathrm{mod}(p-1)(q-1)) \quad (7)$$

then:

$$m^{ed} = m(\mathrm{mod}\ N). \quad (8)$$

But $$m^{ed} = (m^e)^d \quad (9)$$

In encryption methods, e and d can be regarded as encryption and decryption keys, respectively. So, suppose the number m is a "message" that needs to be encrypted. If m is raised to the power of e, a new number, $m^e$ mod N, is obtained, which doesn't look at all like m. However, if d is known, it is only necessary to raise the encoded number, $m^e$, to the power of d to get back m, (the "message" !). It turns out this is the only way to easily get back to m, and that knowing e and N tells you nothing useful about d, referred to as the "private" key. The numbers p and q are needed to easily compute d but that means factoring N, which is computationally very hard. Therefore the numbers e and N are "published" (referred to as "public" keys): anyone can use them to encrypt messages, but only those having the number d can decrypt them. Then d can be exchanged between interested parties using a secure method such as Diffie-Hellman key exchange (as described hereinabove), which relies on DLP. See also, the Internet web-site: en.wikipedia.org/wiki/Public-key_cryptography.

Simultaneous Bidding

Both DLP and PNF already offer solutions to some of the problems described in the Background section of this application. Each solution has other counterparts in the modern world and can form pieces of larger, new approaches to other problems. One such problem is simultaneous bidding, i.e., where two parties, who want to bid for an item owned by a third party, wish to discover who is willing to bid the higher amount but where neither have the chance to change their bid based on the other revealing their bid. This is an example of the ubiquitous "First Mover Disadvantage", i.e., once one party reveals their bid the other has a knowledge advantage they can profit from.

In the material world, sealed envelopes containing two bids (numbers) would be given to the seller, hence preventing either bidder from being able to base their bid on what the other is willing to pay, e.g., one bidder bidding $1 more than the other to win the right to purchase the item being bidded on. Once the bids are submitted they cannot be changed, even though they are not known until the envelopes are opened. Any attempt to claim a different bid is contradicted by the (opened) envelope contents.

In the electronic world, an encryption method such as PNF (and the public-private key exchange approach) makes it possible to achieve a similar level of secrecy as well as to reveal whether a party has changed their position (e.g., upon learning of the other party's number): although it is not possible to prevent a party from trying to cheat (claim a different bid than was "sealed"), it turns out to be possible to reveal whether in fact they cheated. Only after both bids have been deposited and "opened" can each party know what the other's bid is. However, the protection offered is more than just during transmission of the respective bids.

The method described herein is therefore a new application of public-private key exchange that relies on factorization of a large prime number. One party uses the prime number to encrypt their bid, but doesn't send a decryption key until they have received the other party's bid.

Thus, a simultaneous bidding situation can proceed as follows, using a form of asymmetric encryption. Suppose a first party chooses prime numbers p and q, and a second party chooses different primes, p' and q'. The first party encodes their bid, m, using e derived from p and q, then provides the second party with $m^e$, as well as e and N, the product of p and q. The second party provides the first party with their respective $(m')^{e'}$, e' and N'. After the first party has received the second party's encrypted bid, it sends the second party p and q, the factors of N. With this, the second party can calculate d from equation (6), and from this decrypt the first party's encrypted bid using equation (9). Note there is no way for the first party to change their bid. The Fundamental Theorem of Arithmetic (FTA) states that there is only one way to factor a number into powers of primes (where the power(s) can each individually be 1), so p and q are the only primes that, when multiplied together, can produce N, which was provided along with the encrypted bid. With p and q there is only one d that will work with e, which the first party also sent to the second party.

Therefore, the number (bid) now in the second party's possession cannot be changed by any choice on the part of the first party once it has been sent: the second party just can't read it until the first party sends over p and q. Similarly, the first party cannot read the second party's bid until it receives the second party's p' and q' but neither can the second party change the number that it already provided to the first.

This process is illustrated in FIG. 1, which shows a "digital lockbox" (100) permitting Party1 and Party2 to exchange information, and constitutes three phases (150), (170), and (190) (denoted by separate boxes having dashed boundaries). It should be noted that, while there are similarities with methods (such as a lockbox) that can be carried out without computers, the implementations herein rely on technology that is not available to those who are working solely with physical objects.

In a first phase (150), both parties generate their own sets of keys and encrypt their respective bids. In the first phase, both parties can agree to encrypt using a scheme such as prime number factorization.

Thus, Party1 generates RSA keys (107), leading to a set of Public Keys1 (109) and a set of Private Keys1 (111). Party1 then starts the bidding process with Bid1 (101), which it encrypts (103) to create Encrypted Bid1 (105).

Correspondingly, Party2 generates RSA keys (108), leading to its own set of keys: Public Keys2 (110) and Private Keys2 (112). Party2 then enters the bidding process with Bid2 (102), which it encrypts (104) to create Encrypted Bid2 (106).

In the second phase (170), the parties exchange their respective public keys and encrypted forms.

Thus, Party1 sends (115) Encrypted Bid1 (105) and Public Keys1 (109) to Party2, and Party2 sends (116) Encrypted Bid2 (106) and Public Keys2 (110) to Party1.

At this stage neither party can yet read each other's bids; each has effectively received a digital lockbox. Furthermore, it should be noted that neither party needs to send both its encrypted bid and corresponding public keys to the other party at the same time; of course, the receiving party cannot do anything with the encrypted bid it receives until it receives the corresponding keys (both public and private).

In sum, there are three pieces of information: a private key and two public keys. Neither party can work out the private key from the two public keys.

In the third and final phase (190), the parties exchange their respective private keys.

Party1 sends (123) its Private Keys1 (111) to Party 2, who then uses them (in conjunction with the previously received Public Keys1) to decrypt (120) Encrypted Bid1 (105), thereby revealing Bid1 (101).

Correspondingly, Party2 sends (124) Private Keys2 (112) to Party1, who then uses them (in conjunction with the previously received Public Keys1) to decrypt (119) Encrypted Bid2 (106), thereby revealing Bid2 (102).

The physical equivalence of this situation is that the two parties have exchanged "locked boxes", each holding that sealed envelope containing their bids. Once the boxes have been exchanged, then the parties exchange keys to open each others' boxes. The exchange of the keys does not have to be simultaneous because the other party already has the other's bid, but just can't yet access it. A third party who intercepts the exchange and obtains one party's private key cannot decrypt the message unless they also have the corresponding 'public' key. Of course, one party could give the other the key to the box that they have in their possession, and the other party could refuse to provide the key to the one they have, but that would not be simultaneous key exchange. And, in that eventuality, trust in the transaction is automatically invalidated. The processes under consideration herein are not ones that can enforce good behavior by the parties to the transaction; rather they are ones that make bad behavior conspicuous. In what follows, the "locked box" capability will prove useful as a component of solutions to other problems described herein.

Application to Chemistry

As a practical application to chemistry, consider the use of DLP for discovering whether two molecular structures are identical. Any molecule can be represented by a lexicographic description known as a SMILES string (Daylight Chemical Information Systems, Inc., Laguna Niguel, Calif.; www.daylight.com/smiles/index.html). For example, the SMILES string for benzene is: c1ccccc1.

Such descriptions can be made unique (canonical) and include such "meta" information as stereochemistry. Thus, isomeric canonical SMILES strings are sufficient to uniquely represent any molecule in a corporate collection. Suppose such a 'string' of characters is transformed into a number. There are several ways to do this but, for example, certain ways could be based on the fact that each symbol in a SMILES string has an ASCII code: 'c' is 99, '1' is 49. By the FTA, the SMILES string can be transformed into a unique number thus:

$$(10) \tag{10}$$

wherein the nth character within the original string is replaced by the nth prime number raised to the power of the character's ASCII equivalent. The FTA says that any number, $f$, can have only one such factorization and so this uniquely represents the SMILES string. Furthermore, it is also an awfully big number!

However, consider the Discrete Logarithm Problem applied to this number, i.e., $$g^{f(SMILES)} \bmod N = y. \tag{11}$$

Now the number, y, representing the SMILES string must be between 1 and N.

Furthermore, given the DLP, it is impractical to calculate $f$(SMILES) from y. The problem, however, is that we are not guaranteed that the former function, y, is provably unique; even though there is a unique value of $f$(SMILES) from a given SMILES string, y from equation (11) is only probably unique. As such, $f$(SMILES) is referred to as a one-way hash function, a hash being a representation of a larger number that has lost some information. Typically, for a good hash function, the probability of a hash collision, i.e., in this instance two $f$ values giving rise to the same y, depends on the square root of the number of possible y values, i.e., $\sqrt{N}$. As such, if N were very large, e.g., 200 digits, we would have to digitize $10^{100}$ SMILES strings before we'd likely come up with a repeated y. This assumes that each SMILES string gives rise to an essentially random y. Reasonable arguments can be made that this is very likely here: a small change in a SMILES string gives rise to a dramatically different y-value. Even though such assertions are not proofs, it can be proved that hash functions such as this are "collision resistant"—by which is meant that actually finding a collision by looking for one is computationally hard. For instance, suppose one party has a value of y that corresponds to a molecule belonging to a second party, but wants to make a molecule that will produce the same value of y. The first party does not care that this molecule is actually the same as the second party's; just that it gives the same hash, y. To do this the first party either has to just make random molecules and test them (bearing in mind that the number of potential molecules is vast), or they could try to find what $f$ might be and from there make better guesses as to what molecule would make the same value of y. But because of the way that the DLP works, it is not possible to go from y to $f$. As such, "spoofing" the identifier, y, of a molecule with a different molecule is computationally hard.

A second representation of molecular structure that is commonly used is referred to as a 'fingerprint'. A fingerprint is typically a set of ones and zeros where a one represents the presence of a property, a zero an absence. Fingerprints have become the basis of a standard way of comparing molecules, i.e., if two molecules have the same pattern of the presence or absence of a set of properties then they are likely to have similar molecular features. Typical fingerprints actually encode some aspect of the bonding pattern of a molecule, so that two molecules that have similar fingerprints are also likely to have similar chemical structures. Conversely, if two different molecules have identical fingerprints it does not mean that they have the same molecular structure; in this way fingerprints are also a type of hash function because some structural information is "lost" when creating the fingerprint.

In principle, there are many fingerprints that could have been generated from collections of different molecules. As such, it might seem that one way to securely compare molecules might be to just compare fingerprints. After all, it is not possible to inspect a fingerprint and know which molecule produced it, and even if two fingerprints are the same it does not mean that they represent the same molecule. However, it has been shown that molecular fingerprints are typically not collision resistant. Given a fingerprint, it is computationally feasible to produce a molecule having exactly the same fingerprint. This is due to the linear additivity of the effect of changes to a molecule on a fingerprint, i.e., small changes to a molecular structure typically result in small changes to a fingerprint, so it is easy to define a 'fitness' function and train, for instance, a genetic algorithm to gradually improve the similarity between a starting structure and a final exact match with a target fingerprint. It is exactly the feature of fingerprints that are valued for comparing molecules, (similar molecules have similar fingerprints), which make them non-collision resistant and therefore not secure.

However, suppose there were a method by which the fingerprints could be securely compared, i.e., the owner of the first fingerprint could learn the similarity of their fingerprint to that belonging to a second party, but without learning the identity of the second fingerprint, the one exception being if the algorithm reports that the two fingerprints are actually identical. In this case there could be two methods—both highly secure and having nothing in common with one another—that report that the two molecules are identical. Such a method for securely comparing a fingerprint, in fact any string of bits (a bitstring), is presented hereinbelow. With this method it is possible to not only establish the identity (to an astronomical certainty) but also the chemical similarity (or other basis of similarity) of two molecules with no further exchange of information.

Fingerprint (Bit-String) Comparison

The nature of the problem can be described with the aid of the following fact pattern. Alice has a string of twenty 1's and 0's thus:

$$[10010001001010101000 1]  \quad (12)$$

Bob has a string of length twenty, thus:

$$[01010101001010101001 1]  \quad (13)$$

Both Bob's and Alice's strings have the same number of bits, though the position of each "1" and "0" is not the same in each string. The question is how similar are these two strings? In the example, bit-strings (12) and (13) have many bits in common, though the first, second, sixth and nineteenth bits (when read left to right) differ.

A typical measure of the difference between bit strings is called the "Hamming distance", also known as the "City Block distance" or, mathematically, the L1 distance. L1 means taking the sum of the absolute differences at each position, whereas L2 means taking the square root of the sum of the squares of the differences at each position. In this instance, it makes little difference whether L1 or L2 is used because the entries in each ordered set ("vectors") are 1 and 0 (and so the difference at any given position cannot exceed 1, so nor can the square of the difference). In any case, this distance is referred to as the L1 distance for convenience. The L1 distance is also equal to the number of non-zero bits in the result of applying the XOR logical operation ($\oplus$) to the two strings. The L1 distance between the strings of Alice and Bob is 4 because there are 4 positions that are different. If Alice and Bob could each learn the value of L1 without revealing their actual strings then they would have disclosed the minimum information necessary to assess their similarity but could learn nothing more. While this is not a ZKP, it involves Zero Additional Disclosure (ZAD), because all that was disclosed was what was asked for, i.e., how similar are the strings, nothing more.

Suppose Alice and Bob knew a trusted third party, Christopher. They could both encrypt their strings, send them off to Christopher who would then decrypt them, compare each bit and determine the L1 distance, thus:

$$[10010001001010101000 1]\oplus$$
$$[01010101001010101001 1]=$$
$$[11000100000000000010]  \quad (14)$$

The operation "$\oplus$" is the Logical XOR operation. XOR means "Exclusive OR" and produces "1" from a pair of bits that differ from one another, and otherwise gives zero. That is:

$$0\oplus 0=0  \quad (15a)$$

$$1\oplus 0=1  \quad (15b)$$

$$0\oplus 1=1  \quad (15c)$$

$$1\oplus 1=0  \quad (15d)$$

Thus XOR picks out the four differences between the strings of Alice and Bob, a "1" appearing in its place in the resulting string expressed as the final string in Equation (14). All Christopher has to do now is to count up the number of bits in the XOR string, L1, and send this result back to Alice and Bob. Note that he cannot send the result string back to either—were he to do this it would be easy for Alice or Bob to reconstruct what the other's string must be. In fact, it is straightforward to show that:

$$([A]\oplus[B])\oplus[A]=[B]  \quad (16)$$

In other words, all Alice has to do is to XOR the result string with her own string to generate Bob's string (and vice versa).

However, and this is a key discovery here, Christopher does not have to count up the number of bits in the return string and return this to Alice and Bob. All he has to do is to randomly permute the bits within this string and then send it back to Alice and Bob. For instance, each bit could be randomly assigned one of the numbers from 1 to 20 and the bits reordered by the size of the random number each receive. They then look at this string and count the number of bits—still 4—but neither has any idea where the actual differences fall. Only Christopher knows this, assuming he has kept a record of the permutation applied to the original XOR string. Alice and Bob know the magnitude of the difference between their strings but nothing about where those differences fall, so this is now a ZAD situation.

But what if Alice and Bob do not know a Christopher? Can they get to the same result on their own? The surprising answer is a "Yes, but". It is possible for Alice to learn the L1 between their strings, without learning Bob's string, but Bob learns nothing. That is, it is possible to have a secure but asymmetric transfer of information. Of course, Alice is free to share L1 with Bob, but Bob has to take this on trust unless he is allowed to run the same algorithm on the same strings as Alice. To see how this works consider the above scenario but suppose Alice and Bob encrypted their strings first (putting aside how, for now). Christopher receives both strings but now does not know what they are, given that they have been encrypted. Then he wants to XOR them to generate the result of the comparison string. However, he cannot because the strings are encrypted! But suppose he ignores that and XOR's them anyway, then permutes the result and sends that back to Alice and Bob. One might expect this string to have no relevance to the L1 distance; however, in 1982 Goldwasser and Micali (GM) described an encryption process in which the XOR of the encrypted strings IS the encrypted string of the true result. That is, using the GM scheme, Christopher would be sending back the permuted, encrypted XOR string. Now both Alice and Bob, since they know the encryption method, can decrypt the result and once again retrieve L1, but not know where in the string the differences lie. This is a remarkable result and is an example of a new application of "homomorphic encryption". Whereas other encryption schemes, such as RSA, apply to whole messages, or numbers, GM keys are used for bit encryption. Thus, RSA Keys are applied in a "lock-box" situation where GM keys can be used for bit-string encryption where there is to be an XOR event.

Homomorphic encryption allows for arithmetic computation on the encrypted form such that when the encrypted form is decrypted the result is the same as if the arithmetic was performed on the unencrypted form. The GM method is an example of homomorphic encryption that allows for XOR operations on encrypted forms. For many years there were relatively few examples of homomorphic encryption, and each only worked for one mathematical operation (addition, subtraction, etc.). An example has already been described above with the RSA algorithm. As described above, if it is desired to encrypt a number m, the following expression can be formed:

$$m^e = j \pmod{N} \tag{17}$$

Where e and N are as described above, and here j is the encrypted form of m.

Suppose there is a second number, n, that is encrypted to form k:

$$n^e = k \pmod{N} \tag{18}$$

Now the result of multiplying j and k, the encrypted numbers, is the expression (19):

$$j*k = m^e n^e = (mn)^e \pmod{N} \tag{19}$$

Decrypting the product of j times k, gives expression (20):

$$(j*k)^d = (m^e n^e)^d = m^{ed} n^{ed} = mn \pmod{N} \tag{20}$$

which means that multiplying the encrypted numbers also involves multiplying the underlying, unencrypted numbers. This is homomorphic computation, but it is only applicable for multiplications. Multiplication is also possible with the ElGamal cryptosystem, which relies on DLP. Addition is possible with the Benaloh, and also the Paillier cyptosystems, both of which also rely on DLP.

The Mathematics of GoldWasser-Micali Encryption

GM encryption is based on what is called "quadratic residuosity", and essentially asks whether a number is a square, modulo a given N. In normal arithmetic it is easy to tell if a number is a square: simply check if its square root is an integer. Here, the question is considered for modulo, or clock, arithmetic.

Suppose, as usual, that N is the product of two large primes, p and q. Then the question is whether, for a given x, there exists a y such that:

$$x = y^2 \pmod{N} \tag{21}$$

It turns out that, if p and q are both known, this is fairly easy to answer. All that is necessary is:

$$x^{(p-1)/2} = 1 \pmod{p} \tag{22}$$

and $$x^{(q-1)/2} = 1 \pmod{q} \tag{23}$$

However, if p and q are not known, a solution to equation (21) is very difficult to ascertain, i.e., it is as hard as factoring N.

Now, suppose there is a number such that equation (21) is not true, i.e., x is not a square. Suppose, further, that:

$$x^{(p-1)/2} = -1 \pmod{p} \tag{24}$$

and $$x^{(q-1)/2} = -1 \pmod{q} \tag{25}$$

then any number $z^2$ that is multiplied by x also cannot be a square. To see this, consider that:

$$(z^2 x)^{(p-1)/2} = z^{(p-1)} x^{(p-1)/2} = x^{(p-1)/2} = -1 \pmod{p} \tag{26}$$

because, by "Fermat's Little Theorem":

$$z^{p-1} = 1 \pmod{p} \tag{27}$$

and:

$$ab \pmod{p} = a \pmod{p} * b \pmod{p} \tag{28}$$

So, suppose there is such an x (they are easy to find) and the product $xz^2$ is computed from some large, random z Because p and q are both known, it is possible to quickly find that $xz^2$ is not a square, but no one else can without knowledge of p and q. This represents a "1" in the code. Next consider just $z^2$ (i.e., forget the x). Again, it can easily be proved that this is a square using the factors p and q. This, then, represents a "0" in the code. Thus, all that is required to do to encode a bit-string is to replace each zero or one with either $z^2$ or a $xz^2$ respectively, where z is a different (randomly chosen) number for each bit, and x obeys equations (24) and (25). By providing another party with the values of x and N they can do the same, i.e., these are "public" keys. However, reversing the process, i.e., finding whether each number represents a one or a zero is computationally exponentially hard without knowing p and q, which are the "private" keys.

Four things are important to note here.

First, the size of the message has been greatly expanded. A very large number now represents each bit in the bitstring. This is why this approach has not been used as extensively as a cryptographic method.

Second, the multiplication of the "1"s and "0"s obeys an interesting property. Suppose two encrypted "1" values are multiplied together:

$$(z^2 x)(w^2 x) = (zwx)^2 \pmod{N} \tag{29}$$

i.e., multiplying two numbers that are not squares produces a square modulo N, i.e., {1, 1}={0}.

If two numbers, one of which is a square the other not, are multiplied together:

$$(xz^2)(w^2) = x(zw)^2 \pmod{N} \tag{30}$$

The result is not a square, therefore {1,0} or {0,1} gives {1}, i.e., not a square.

Finally, multiplying two numbers that are squares together:

$$(z^2) w^2 = x(zw)^2 \pmod{N} \tag{31}$$

i.e., {0, 0} gives a {0}, which is a square.

In sum, the multiplication of the large numbers representing the ones and zeros gives other large numbers that have the exact property of the XOR of the underlying ones and zeros. This is the homomorphic property used throughout this application.

Third, each bit is represented by a random number (and x). In fact, GM is one of the very few probabilistic encryption methods. This is important in what follows because it means that, although the same key is used for each bit, the representations will all be different in an unpredictable way. This is vital. The key step here that makes the secure comparison protocol effective is the permutation of the bits. However, if two parties (e.g., Alice or Bob in the foregoing) could "descramble" the permuted bits they could work out each other's strings. What prevents them from doing this is that each bit is independently encoded with, essentially, a new random seed, and that the values representing each bit cannot be 'traced' back to their origin once the order of these values are scrambled.

Fourth, the level of security is determined by the size of the number representing each bit.

One further aspect of the XOR operation should be noted, given that the operation is performed by multiplying two large numbers, modulo another large number, i.e., A*B=C (mod N). A key feature here is that we can take the resultant C and put it in a random position in the list of all the other numbers that represent bits in the XOR'd string of bits— hence hiding what the original XOR string looked like (and so preventing someone from uncovering the original string). A requirement, then, is that someone cannot work out what A is from C alone. If this was not modulo arithmetic this might be a problem, e.g., suppose we have the following numbers from a party A and a party B:

A1=5, B1=7, so C1=35; and

A2=8, B2=3, so C2=24.

The procedure would be to return (C1, C2) in arbitrary order so that the provider of {B1, B2} does not know whether they are seeing {A1*B1, A2*B2} or {A1*B2, A2*B1}. However, since party "B" knows their own values, they would reason that C1 could not have come from multiplying anything by B2 (because 35 is not divisible by 3) so it must have come from B1, i.e., the original order is restored.

When performing Modulo arithmetic things are different, however. In fact, in the system described herein, there is essentially no way to do this easy factoring. There is an exception, however. If one of the numbers from party B is a multiple of one of the keys then whatever "A" number is used will still return a multiple of that key—i.e., someone could tell where that "C" had come from. It turns out that this doesn't help much; for one thing party B using this approach essentially gives away their keys, something A can easily detect.

Recently, the first method to allow fully homomorphic computation, i.e., both additions and multiplications, was reported (Craig Gentry, "A fully homomorphic encryption scheme", Ph.D. thesis, Stanford Univ. (2009), incorporated herein by reference). An advantage of this approach is the ability to perform secure computations on hosted computer resources (e.g., as in so-called "cloud" computing").

The adaptation herein though is different. It does not matter where the computation is done; what matters instead is the secure generation and transfer of information. This is therefore a novel application of the mathematics of homomorphic encryption. In particular, the observation that L1 distances can be securely computed without release of primary data has not previously been demonstrated.

Returning to Alice and Bob and Christopher: so far we have shown that Alice and Bob can send encrypted strings to Christopher, who performs encrypted computations, scrambles the result and returns it to both Alice and Bob without revealing to either what the other's string is. What is to stop Christopher leaking Alice's original (encrypted) string to Bob? If he were to do this, Bob could just decrypt Alice's string. However, as has been shown in the RSA algorithm, it is possible to have a public key that both Alice and Bob can use to encrypt (designated by e in the above), while the decryption key, d, is known only to Alice. In this circumstance, Christopher leaking Alice's string to Bob does no good to Bob, while Christopher leaking Bob's string to Alice reveals Bob's string. Such a scheme has become asymmetric and insecure for Bob. Of course, Christopher could know e and d, where Alice and Bob know only e, but that returns the parties to a state where Christopher knows everything and their trust in him must be complete!

But suppose there is one more evolution of the scheme. Rather than have Christopher receive the strings and act as a middleman, suppose the middleman is removed. Suppose Alice generates e and d, encrypts her string with e, and sends Bob her encrypted string and e. Bob encrypts his string with e, performs the XOR with Alice's encrypted string, and then applies a permutation to the resulting bits, then sends this back to Alice. Alice never gets to see Bob's string, encrypted or not: no one does, except Bob! Alice does get to decrypt, and hence see, the results string, but as Bob has applied a permutation she has no information as to where the bits originally fell. Hence Alice is now in possession of L1 and neither she nor Bob have exposed anything beyond that which was not protected by strong cryptography. By this device, not only has the need for a trusted third party been removed, security has actually increased because no one other than the interested parties ever has control of unencrypted strings. This method is referred to herein as Asymmetric Secure Comparison ("ASC") and it is illustrated in FIGS. 2A and 2B.

Figure 2A:
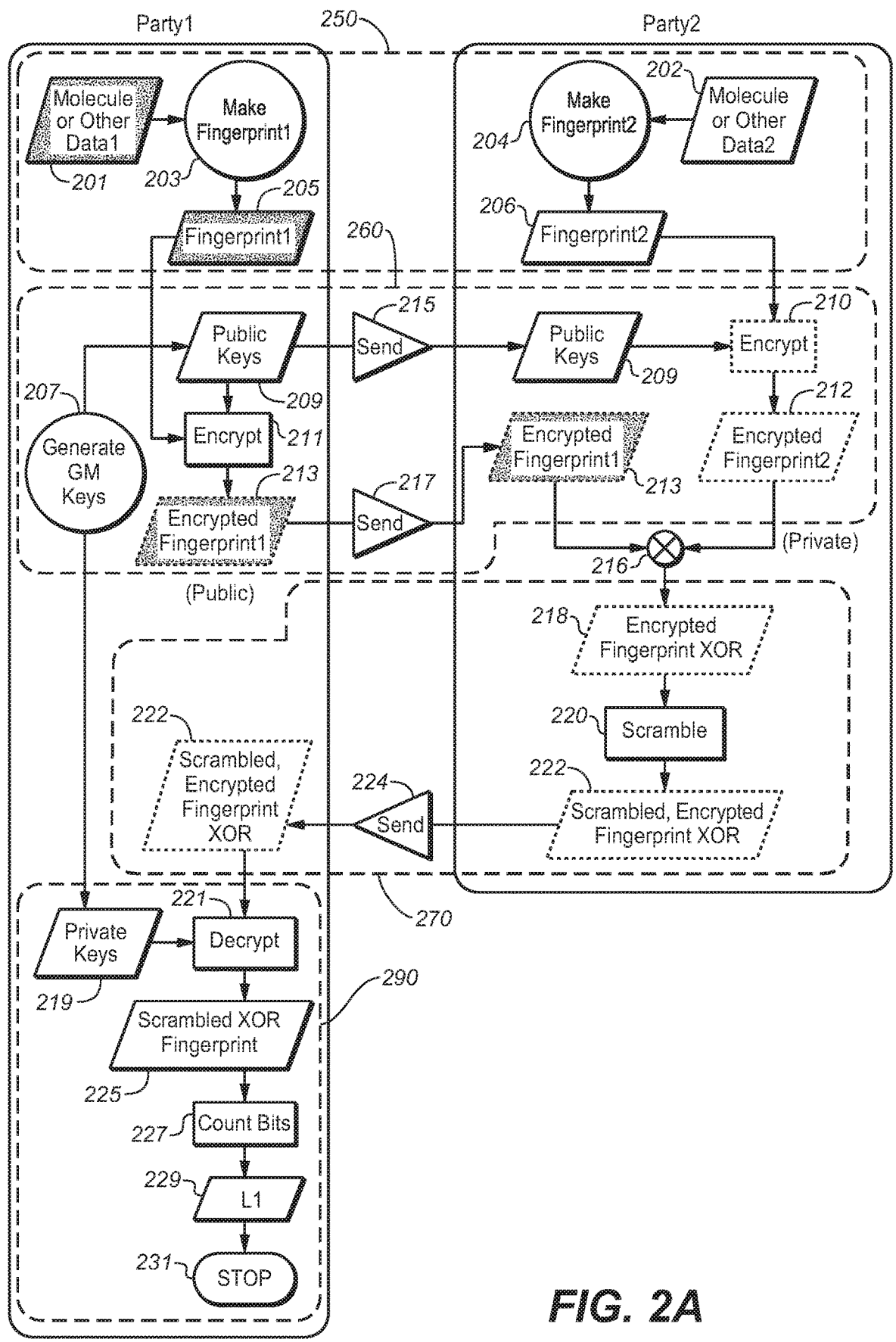
FIG. 2A shows a method for asymmetric secure comparison of information between two parties, having four steps: i) Make fingerprints; ii) Encrypt with public keys and exchange with the other party; iii) return encrypted, scrambled XOR'ed fingerprints; and iv) decrypt locally.
Figure 2B:
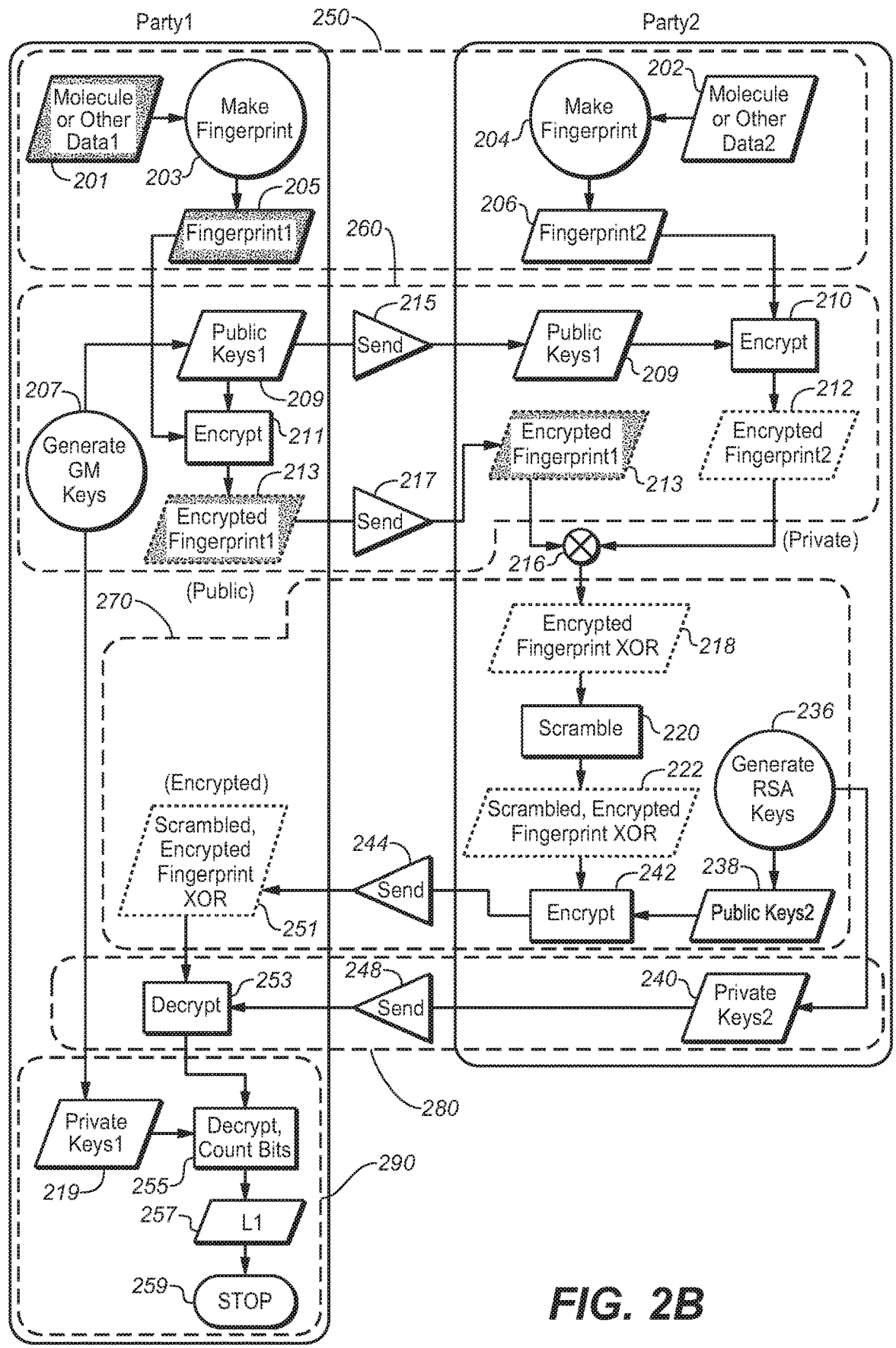
FIG. 2B shows a synchronized version of ASC: the L1 distance can only be determined when one side releases a decryption code.

In FIGS. 2A and 2B, the transaction is between Party1 and Party2. The process is illustrated in four phases (250), (260), (270), and (290) in FIG. 2A, and in five phases (250), (260), (270), (280), and (290) in FIG. 2B (each denoted by boxes having dashed line boundaries).

In a first phase (250), the parties create their respective fingerprints. In FIG. 2A, Party1 takes molecule or other data1 (201) and makes (203) fingerprint1 (205). Meanwhile, Party2 takes molecule or other data2 (202) and makes (204) fingerprint2 (206).

In a second phase, (260), encryption of the parties' fingerprints takes place. Party1 generates GM keys (207) and associated public keys (209) and private keys (219). Fingerprint1 is encrypted (211) with Public Keys (209) to create encrypted fingerprint1 (213).

Party1 sends (215) Public Keys (209) to Party2, who also uses them to encrypt (210) Fingerprint2, thereby creating Encrypted Fingerprint2 (212). Party1 also sends (217) Encrypted Fingerprint1 (213) to Party2, who XORs (216) them with Encrypted Fingerprint2 (212), thereby creating Encrypted Fingerprint XOR (218).

In a third phase (270), scrambling occurs. Party2 then scrambles (220) the Encrypted Fingerprint XOR (218) to create Scrambled, Encrypted Fingerprint XOR (222), which (s)he sends (224) back to Party1.

In a fourth phase (290), Party1 computes L1. Party1 first decrypts (221) Scrambled, Encrypted Fingerprint XOR (222) using private keys (219), thereby generating a (de-crypted) scrambled XOR fingerprint (225). The bits in this fingerprint are counted (227), giving a value of L1 (229), at which point the process can conclude (231).

In FIG. 2B, in the first phase (250), the first few steps proceed as in FIG. 2A. Party1 takes molecule or other data1 (201) and makes (203) fingerprint1 (205). Meanwhile, Party2 takes molecule or other data2 (202) and makes (204) fingerprint2 (206).

In second phase (260) encryption takes place. Party1 generates GM keys (207) and associated public keys1 (209) and private keys1 (219). Fingerprint1 is encrypted (211) with public keys1 (209) to create encrypted fingerprint1 (213).

Party1 sends (215) Public Keys1 (209) to Party2, who also uses them to encrypt (210) Fingerprint2, thereby creating Encrypted Fingerprint2 (212). Party1 also sends (217) Encrypted Fingerprint1 (213) to Party2, who XORs (216) them with Encrypted Fingerprint2 (212), thereby creating Encrypted Fingerprint XOR (218).

In third phase (270), Party2 then scrambles (220) the Encrypted Fingerprint XOR (218) to create Scrambled, Encrypted Fingerprint XOR (222).

Now additionally, and different from FIG. 2A (where Party2 has control of when Party1 can decrypt the XOR string), Party2 generates RSA Keys (236) and Public Keys2 (238) and Private Keys2 (240) therefrom. Scrambled, Encrypted Fingerprint XOR (222) is then encrypted with the RSA Public Keys2 and sent (244) to Party1 along with the RSA Public Keys2, who receives it as a doubly encrypted scrambled Fingerprint XOR (251).

In a fourth phase (280), Party2 also sends (248) Private Keys2 (240) to Party1, who uses them to decrypt (253) the doubly encrypted scrambled Fingerprint XOR (251). Note that this allows Party2 to control when Party1 can view the result of the fingerprint comparison.

Finally, in phase (290), the regenerated scrambled encrypted XOR fingerprint is further decrypted (255) with Private Keys1 (219). The bits in this decrypted fingerprint are counted (255), giving a value of L1 (257), at which point the process can conclude (259).

However, as described above, an asymmetry has been introduced into the process in FIG. 2B. Alice (illustrated as Party1, say) possesses L1, not Bob (illustrated as Party2). In many circumstances this may not matter, and may even be an advantage if it reflects the actual relationship between the parties. For instance, in the case of a small company comparing compounds to those of a larger company, the larger company would be the one acting on the information contained in L1. If it decides there is something worth talking more about to the smaller company it makes that decision. The smaller company does not have any power to make the large one progress further; the relationship is asymmetric.

In other cases, there may be an understanding that, once there is evidence that useful business can be conducted, both sides will reveal their respective primary data. For instance, consider the case of a buy-sell transaction, perhaps the sale of a house. Suppose the house owner (seller) makes a bit string that represents the lowest price they would accept; they might do this by agreeing with a bidder that prices will be expressed to the nearest $1000 and then start with a bit-string 1000 bits long. If the seller's lowest acceptable price is $400,000 they set the first 400 bits to one and the rest to zero. If the highest bid a prospective buyer could consider is $420,000 then that person makes a string of all zeros except that of the 420th bit, which is set to one. If the ASC protocol is then followed with the seller receiving the L1 distance, they will find that there are 401 differences between the bidder's bitstring and theirs. This can only happen if the bit that the bidder set was higher than the 400th bit, i.e., where the seller's bits turned to zero. If the bidder's upper price had been $380 k, say, then the bidder would have set the 380th bit (and no others) to one, and the seller would have found 399 bits were different between the strings, indicating a bid lower than the seller's acceptable minimum. Note, though, that because this is ASC the seller does not know the actual value of the maximum bid, only whether it is above (or below) what they are prepared to settle for. So if the seller finds 401 bits set to one they know that it is worth discussing things further; conversely if they find 399 bits set to one there is no point in the parties wasting each others' time. The point is that the ASC method only provides an indication that seller and buyer are starting out with the possibility of a deal. It does not tell either party if the buyer's initial bid is significantly over the seller's asking price.

Interestingly, it is pointless for the buyer to lie about L1 to the seller. If the bids are concordant (i.e., there is no "gap" between the two: the asking price is less than the buying price), walking away from negotiations when the seller knows that the parties could reach a price that makes them both happy hurts both parties. One party telling the other that they want to negotiate when their expectations are not matched should equally be an exercise in frustration. It is in both parties' interests for them both to be truthful about L1. ASC has practical utility here because the parties have established that there is the possibility of a settlement without disclosing anything about their respective positions.

This process is illustrated in various forms in FIGS. 3A-3H for a bitstring having 16 bits and a transaction between parties A (seller) and B (buyer). In each case, B's bid is expressed differently, and the outcome of ASC shown as A XOR B, and a value of L1. The symbol $\nabla$ indicates the operator that computes the sum of the bits in the string. In each case, a scrambled A XOR B string is also shown. Scrambling of course obscures where the bit set to 0 in A XOR B is located.

In FIGS. 3A and 3B, B's bid is expressed by setting a single bit. In FIG. 3A, party B bids too low, and in FIG. 3B, party B bids high. Thus, in FIGS. 3A and 3B, by using only one bit, it is only possible to show whether B's bid is greater than or less than A's offer price.

Figure 3C:
FIGS. 3C-3E, show how asymmetric secure comparison is applied to a bidding situation involving a single number for the buyer and seller but where it is possible to establish whether the buyer's bid exactly matches the seller's price.
Figure 3C:
Figure 3C:
Figure 3C:
Figure 3D:
Figure 3D:
Figure 3D:
Figure 3D:
Figure 3E:
Figure 3E:
Figure 3E:

In FIGS. 3C-3E it is shown (for the same 16-bit bitstring) that if the bidder (B) uses two adjacent bits set to one, it is possible to show whether the bid is greater to, equal to, or less than the asking price. In each case, the lower of the two set bits is the bid; a second adjacent bit is added on the higher side to achieve discrimination. It is possible now to have 0, 1, or 2-bit overlaps with A's asking price. The parties can actually tell now if the bid is (i) greater than (FIG. 3C), (ii) equal to (FIG. 3D), or (iii) less than (FIG. 3E) the selling price. This will be referred to herein as the "GEL" (greater than, equal to, or less than) scheme.

Figure 3F:
FIGS. 3F-3H show how asymmetric secure comparison is applied to a bidding situation involving a range of numbers for the buyer and seller.
Figure 3F:
Figure 3F:
Figure 3G:
Figure 3G:
Figure 3G:
Figure 3G:
Figure 3H:
Figure 3H:
Figure 3H:
Figure 3H:

It is also possible to extend the GEL scheme to determine if two ranges of numbers overlap or not, as illustrated in FIGS. 3F-3H, in which the seller, A, expresses their hoped for sale price as within two bounds (every bit set in the range between), and the bidder sets a bit to "on" at each end of their range. In FIG. 3F, the ranges do overlap at one end, whereas in FIG. 3G, they do not. FIG. 3H illustrates the situation where the range of the bids lies inside the range of the asking prices.

Alternatively, there may be an agreement that, after an ASC comparison of the parties' positions, it is in the interests of the two parties to disclose their respective primary data. For instance, one type of arrangement might be that the parties agree that, if the buyer is willing to buy for a price above the seller's minimum, the parties will immediately split the difference between the seller's minimum and the bidder's maximum. In the illustration hereinabove, that would mean agreeing on a price of $410 k.

In this example, another property of the GM component of ASC is useful, and permits a secondary mechanism to be set up to allow Alice to be sure that Bob is not cheating on his price. The decryption keys for GM are the large prime factors, p and q of the encoding N. In the above examples Bob receives a copy of Alice's bitstring, along with N to enable his encoding. If Alice decides, once she knows L1, that she and Bob should do business they may have agreed that she will release p and q. In the house purchasing example this would mean Bob (the bidder) would immediately find out Alice's lowest acceptable selling price. Effectively, the asymmetry has now switched! Now Bob has more information than Alice. He knows L1, indicating whether Alice wants to do business, but also knows her key piece of information, namely the lowest that she is willing to accept as a purchase price. Alice only knows L1, but she cannot tell, from the strings she holds, what Bob's original string actually was. However, this can be rebalanced if Bob had sent, in addition to his scrambled ASC string, his actual purchase price but encoded using the RSA scheme. That is, he sends Alice his (encrypted) true price along with an N and an e from equation (8). If Alice reveals her secret keys, Bob learns her lowest acceptable price but has no option but to turn over his keys so she can learn his maximum acceptable price. Any refusal would be bad faith as his ASC string informed Alice that such a price is above her minimal offer threshold. Hence, a combination of the ASC protocol and the "lockbox" functionality of PNF algorithms enables a degree of symmetry to the combined protocol. How such a combination can make ASC a more generally symmetric protocol, "Asymmetric Secure Comparison Used Symmetrically" (ASCUS), is described further hereinbelow.

Symmetry is an important aspect in situations where subsequent disclosure may be unlikely. Consider the example referenced in the Background section, and now apply ASC to the issue of learning who earns more money in a calendar year. Suppose there is a friendly wager of $1, going to either the person who earns more—or least!—but there is an understanding that neither party will reveal their actual salary. If the foregoing house price scenario (of FIGS. 3A-3E) is followed, but where the parties formerly encoded a putative sale price they now encode their salaries, then Alice, the recipient of L1, will know if she earns more or less than Bob. However, if they are not going to release the primary data, as in the modified house price example, Alice with her keys and Bob with those to a lockbox he has sent Alice, there is no way for Bob to check if she is lying to collect that $1. In a symmetric comparison Bob would also know L1 but without having to ask Alice. Superficially this would not seem difficult to achieve. If, at the same time Alice sends Bob her string encrypted with her keys, Bob sends to Alice his string encrypted with his keys and each follows the ASC protocol then each should arrive at L1. Furthermore, the final step in ASC—the transmission of a scrambled, encrypted bit-string back to the original party—can be wrapped up in a PNF 'lockbox', i.e., both Alice and Bob can find out L1 at the same time because they would then require keys from each other to discover what their scrambled, encrypted bit-string looks like. There turn out to be two things wrong with this assumption.

ASCUS Problem No. 1

Let's assume Alice is honest, but Bob is not. There is nothing to stop "Evil Bob" using a different string to XOR against the string that Alice sends to Bob (based on Bob's encryption) from the one he sends to Alice to be XOR'd. Imagine this in the context of chemical comparison. Perhaps Evil Bob suspects that his compound is actually quite close to that of Alice but doesn't want Alice to know this. When he receives Alice's encrypted fingerprint, he XOR's it against a random compound, not his own, scrambles the result and sends it back to Alice. Meanwhile he sent his actual compound to Alice who, honestly, XOR's her valuable compound against it and sends the result back to Evil Bob. Alice ends up thinking they have quite different compounds, while Evil Bob knows otherwise.

ASCUS Problem No. 2

As in ASCUS Problem No. 1, assume that Evil Bob wants to trick Alice into believing they have compounds that are quite similar. If he knew Alice's compound he could generate a closely-matching fingerprint and XOR it against Alice's compound, sending her a scrambled string that she would interpret has coming from a very similar compound, i.e., one having very few differences after the XOR. However, Evil Bob doesn't know Alice's key compound; that's what he is after (e.g., perhaps to trick her into disclosure of the primary data). But that is not a problem to Evil Bob. He has the encryption keys from Alice so he can make up a string with any number of bits he wants to send back to Alice, i.e., Alice has no way of knowing that the string returned to her has not actually been XOR'd against anything!

ASCUS problems #1 and 2 are difficult ones and reflect the problem of applying the ASC method to situations that are not naturally asymmetric. Even if there is a $1 bet at stake there may be no consequences for dishonest behavior. However, there are two adaptations to ASC that can make it partially ASCUS, i.e., such that there is a reasonable chance that the nature of Evil Bob will be discovered.

ASCUS Adaptation No. 1

So far it has been assumed that, in an ASCUS based on symmetric applications of ASC, each party does not then need to communicate L1. However, suppose communication of L1 was made a necessary part of the arrangement. Suppose that each has to submit the L1 (which they calculated when they received the Encrypted XOR string back from the other party) to the other party, but by encrypted lockbox as described above. In such a manner the first ASCUS problem can be addressed. With ASCUS Problem #1, Bob has chosen a different molecular fingerprint to XOR, scramble and send back to Alice than the one that represents his molecule. However, this then means he does not know Alice's L1. He can only guess at it. If he had been honest and used the correct fingerprint he would know the L1 to Alice's molecule, but he doesn't. Of course, if Alice reveals her L1, Evil Bob can repeat this number back to her as his own. But if instead the two numbers are lockboxed he has no opportunity to change his declared L1 to that of Alice's. As such, Alice will calculate her L1, receive Bob's L1 via lockbox and discover they are (likely) not the same and know that Bob has been dishonest. Of course, Evil Bob might guess Alice's L1 but the odds will usually be very much against him: he has no way of knowing how different the molecule he actually used is different from Alice's unknown structure.

Figure 5A:
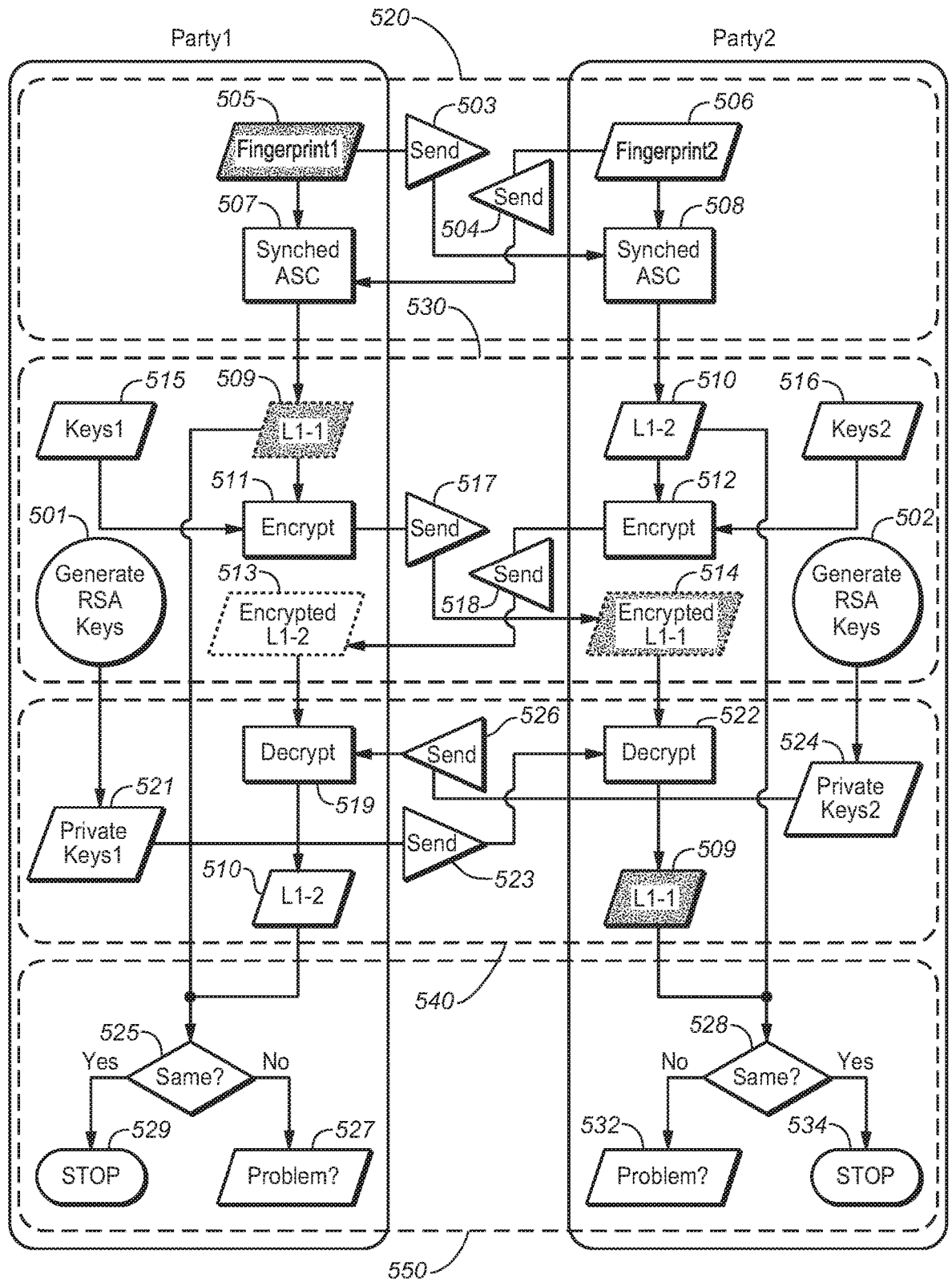
FIG. 5A shows asymmetric ASC: ASCUS Version 1 (Symmetry enforced by L1 equivalence).

This scheme is illustrated in FIG. 5A, and constitutes four phases (520), (530), (540), and (550), the first three of which resembling, respectively the phases shown in FIG. 2B. The last phase in FIG. 5A is an additional validation step.

In FIG. 5A, Party1 and Party2 are entering into a secure transaction. The parties' respective confidential information is expressed as Fingerprint1 (505) and Fingerprint2 (506). In first phase (520), in FIG. 5A, the parties exchange (503), (504) their respective fingerprints with one another in a secure manner. Each party submits both fingerprints to a "synched ASC" process, denoted as (507) and (508) for Party1 and Party2 respectively, in FIG. 5A. The respective synched ASC processes generate an L1-1 (509) for Party1 and a L1-2 (510) for Party2.

Meanwhile, in phase 2 (530) Party1 and Party2 generate (501), (502) respective RSA Keys1 (515) and RSA Keys2 (516), which are different from one another. The respective keys are used to encrypt the parties' L1's as follows: Party1 encrypts (511) L1-1 (509) using Keys1 (515) to produce an encrypted L1-1 (514) that is sent (517) to Party2. Correspondingly, Party2 encrypts (512) L1-2 (510) using Keys2 (516) and sends (518) encrypted L1-2 (513) to Party1.

In phase 3 (540), the two parties decrypt (519), (522), using Private Keys1 (521) and Private Keys2 (524), the respective encrypted L1-1 and L1-2 received from the other parties, thereby liberating the respective original values of L1-1 (509), and L1-2 (510)

Now, Party1 checks (525) whether its decrypted value of Party2's L1-2 is the same as its own original L1-1, and correspondingly, Party2 checks (528) whether its decrypted value of Party1's L1-1 is the same as its own original L1-2. In each case, if the respective checked values are the same as one another, the process stops (529), (534). If not, either party can ascertain whether there has been a problem (527), (532).

ASCUS Adaptation No. 2

ACSUS Adaption No. 1 is useless in the face of ASCUS Problem #2, i.e., where Evil Bob constructs what is supposed to be his XOR'd, scrambled, string entirely de novo, using the public keys Alice sends him. He now knows exactly what L1 Alice will perceive and can place this number in the lockbox he sends to her along with the made up return string. Alice will decrypt the string, unlock the box and believe nothing is amiss. At first glance this would seem an insurmountable problem to her trust in the symmetrized ASC. (Alice cannot trust Bob that what she sees is what he sees.)

However, consider the situation where the number of bits set in a fingerprint is small. This is typically the case in molecular fingerprints. Furthermore, assume that the number of bits that can ever be different between two fingerprints is always less than half the number of bits. In such a circumstance Alice and Bob actually have two choices in the strings they can send to each other to retrieve L1. They can send the regular bitstring for their respective molecular structures, or they can send the complement of that string, i.e., the string where every zero has been turned into a one and every one turned into a zero. Now, every difference unearthed by the XOR operation will be recorded as an equality and every equality turned into a difference. If the bitstring is of length K and there are h differences between two strings, there will be H=K−h differences if one string is "inverted" in this way. If both strings are inverted, then the number of differences becomes equal to h again. Under the condition from above that h<K/2, then no matter what permutations of inversions Alice or Bob do to their strings they can always work out the true h. That is:

$$[A]\oplus[B]=h<K/2 \quad (32a)$$

$$[\sim A]\oplus[B]=K-h>K/2 \quad (32b)$$

$$[A]\oplus[\sim B]=K-h>K/2 \quad (32c)$$

$$[\sim A]\oplus[\sim B]=h<K/2 \quad (32d)$$

So, if the apparent number of bits set is larger than K/2, the actual number is K−h.

Therefore, in terms of gathering information about L1 it makes no difference if Alice or Bob send their true strings or the complement to their strings. However, it makes a difference if Bob is making up a fake XOR string. Bob has no way of knowing whether Alice should be expecting a number of bits greater than K/2 or less than K/2. That depends on information to which he does not have access. He can only learn this number after he has sent Alice the number of bits he has perceived from his own L1. As an example, suppose the bitstring length is twenty (20), and the correct L1 is 2, but Evil Bob is going to send Alice a fake XOR string with 5 bits set to one, i.e., corresponding to an L1 of 5. Evil Bob has to report to Alice that he sees 5 bits set to one in the XOR string she returns to him, because that is the number Alice will see in hers: he made it so! However, if she actually inverted the encrypted string she sent to him she should be expecting to see 15, not 5. Evil Bob has communicated the wrong number and cannot change his report. If Alice inverts strings at random then there is always a 50% chance that Evil Bob will be caught out.

So the combination of ACS with some PNF lockbox adaptations can make a version of ASCUS in which cheating can be spotted with at least 50% efficiency if the bit density is known to be less than 50%. At first glance, though, the protections against the two forms of ASCUS abuse, i.e., using a different string to XOR against the other party's encrypted string, or generating a fake encrypted XOR string, seem to be not equally effective.

In the former case, Evil Bob has to guess how many bits are different between his alternate bitstring and that from Alice. Since he has no prior knowledge of the difference this may be a hard task, e.g., if typical differences range uniformly from one to a hundred he has only a 1/100 chance of not being caught. This is a lot smaller than a risk of ½ if he constructs a fake XOR string. There is, however, one difference between the two situations. Suppose Alice requests they retest their strings. If Evil Bob had constructed an XOR string, he remains in the same situation as before the first test. In the example above he has to decide between constructing a string with 5 or 15 bits set—he cannot know which Alice will be expecting to receive and will be wrong 50% of the time. That is, for each test there is an independent probability of ½ that Evil Bob will be caught.

Figure 4A:
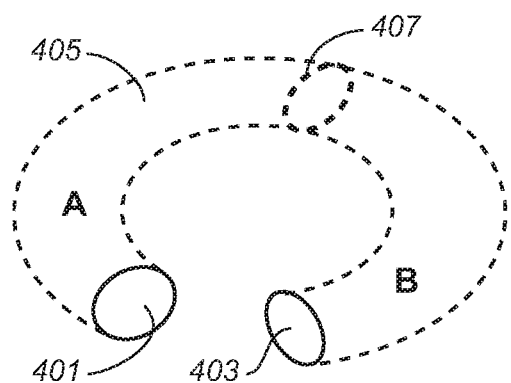
FIGS. 4A-4C show a schematic example of a Zero Knowledge Proof thought exercise.
Figure 4B:
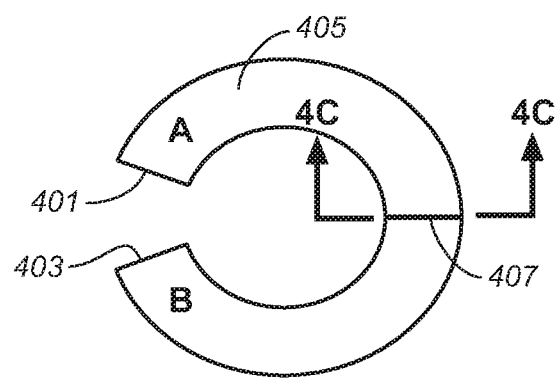
Figure 4C:
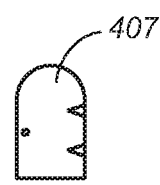

This situation is quite typical of the Zero Knowledge proofs mentioned in the introduction. For instance, the classical example of a ZKP is illustrated in FIGS. 4A-4C. The idea here is that there is a looped passageway (405) having two openings marked "A" and "B", one at either end (401), (403) of the passageway, but such that the passageway (405) is blocked internally by a magic door (407) that requires a secret password to open. The task is to be able to enter the passageway and successfully exit from the correct end (A or B) based on an instruction written down on a piece of paper. In essence, a person goes in with secret instructions for how to exit. The person doesn't open the instructions until he is inside the tunnel. For example, Bob claims to know the password to door (407). Alice writes "A" or "B" down on a piece of paper, seals it in an envelope and hands it to Bob. She then watches him disappear into one doorway (401), (403) or the other. When he is out of sight he is allowed to open the envelope, which informs him which passage he needs to return along. If he had gone down side A and Alice's note says "A" then he simply turns around and comes back. However, if the note says "B", and he has entered through "A", he can only comply if he knows the password. It follows that Bob has a 50% chance of complying with Alice's request if he does not know the password, but a 100% chance if he does. There is a probabilistic component to the process. If the procedure is repeated once the chances of Bob complying both times drop to 25% if he does not know the password, then to 12.5% in a subsequent instance; i.e., the probability of complying every time is $1/2^N$ where N is the number of trials. If Bob continues to comply with the (random) instructions from Alice then Alice can be increasingly sure he does know the password, even though Bob never reveals that fact to her.

There is, however, an important difference between the ZKP described with respect to FIG. 4 and the situation herein for ASC. Each time Bob is 'tested' by Alice he also gets to measure a bit-string of choice against Alice's; i.e., Bob is actually gaining information. This is inevitable because ASC is not a zero-knowledge test. The concept of knowing a "similarity" implies at least some knowledge. For example, Bob could first use a bit-string of all zeros: this would tell him how many bits are set in Alice's string. Then he could systematically turn on one bit at a time to determine which bits are set in Alice's fingerprint. Essentially, Bob gains one bit of information for each test Alice requests.

But suppose Evil Bob was not pursuing a fake XOR string policy but was, instead, simply substituting the fingerprint of a different molecule. If he guessed correctly the first time the number of bits Alice sees in her L1 then he knows for future tests to simply always report this number. Meanwhile, each test chips away at the anonymity of Alice's string, one bit at a time without any added security for Alice. In other words, although the complementarity test is simple to apply, it has limitations. However, these examples do suggest a better approach to making ASCUS more robust to mendacity. The core observation is that anything that reduces Bob's uncertainty over what to report to Alice via the PNF lockbox adds security. If he uses a different fingerprint in his encrypted XOR step he loses knowledge of what Alice will see. If he makes sure he knows what Alice will see, her randomly applying a bitstring inversion removes that certainty. The following method, "random bit padding" (RBP), builds on both observations.

ASCUS and Random Bit Padding

Suppose that before Alice and Bob start the process of comparing strings they settle on a procedure to randomly generate a bit-string of length M. This could be by agreeing to randomly set bits, or to randomly select from a set of pre-existing bitstrings of this length. They agree that they will each independently generate such a random string in secret and append it to the fingerprints they want to compare. They furthermore agree to make two versions of their fingerprints, each with different random strings of this type: one string will be GM encrypted with the keys provided by the other party and sent to the other for testing, the other will be encrypted with their own GM keys and XOR'd locally against the other's encrypted string. In effect, they are both agreeing to commit the sin of ASCUS Problem #1: the use of different public and private strings. However, each also commits to record what random strings were produced in the same PNF lockbox that will later contain their claims about L1. It can immediately be seen that now the expectation ought to be that these L1 values are not the same. This is the way ASCUS Problem #1 is caught, i.e., because if one side does not use the same public and private strings, he or she cannot be guaranteed of knowing both L1 values. However, since the random strings have been recorded, with these in hand Alice and Bob can both backtrack and see if their mutual L1 values, minus the XOR of their random strings, actually do agree. If both were honest this must be so, but the use of such random strings has interesting implications for dishonest behavior. This scheme is illustrated in FIG. 5B, a simplified overview of which is shown in FIG. 5C.

Figure 5B:
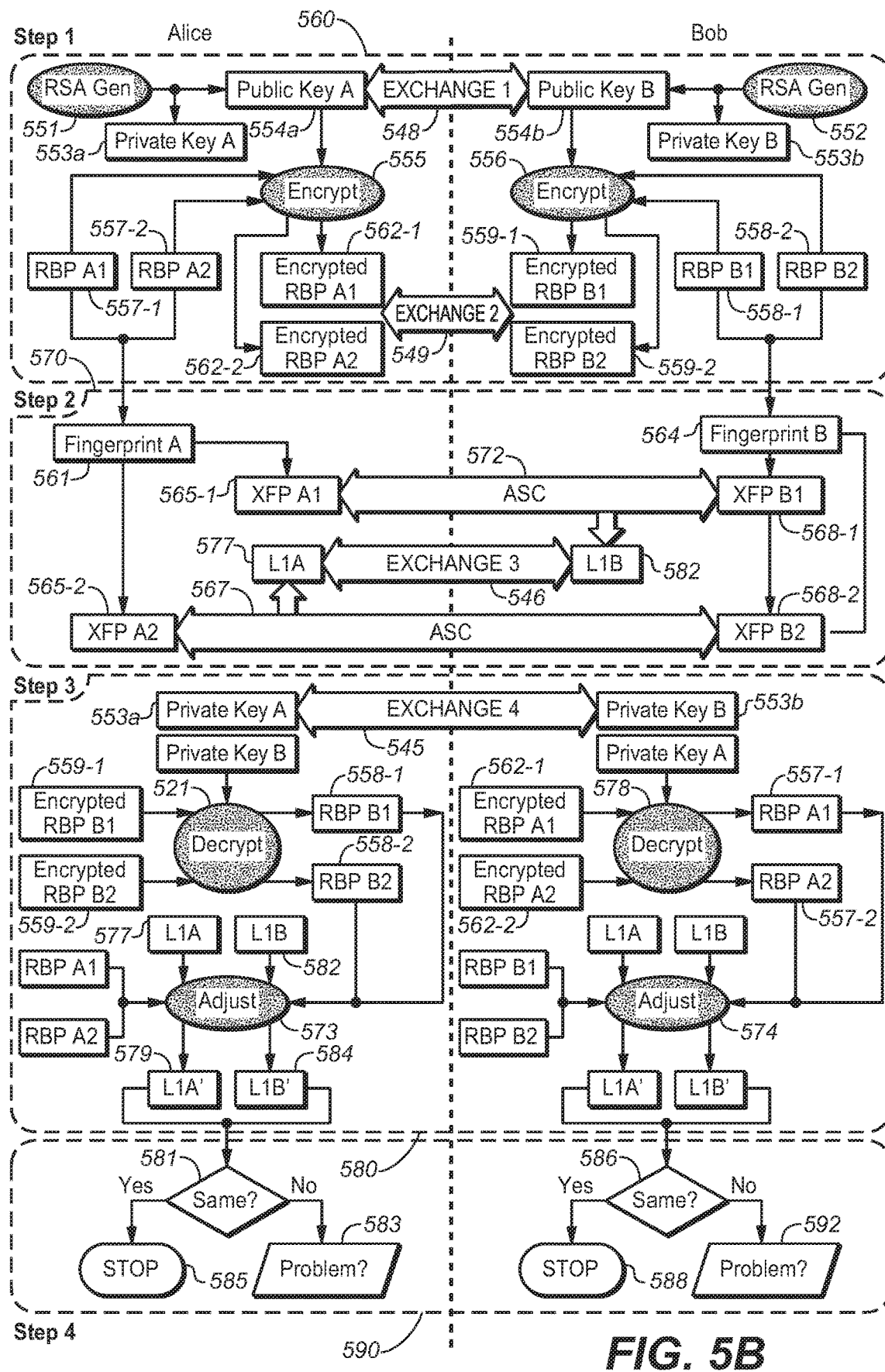
FIG. 5B shows ASCUS Version 2, with Random Bit Padding.
Figure 5C:
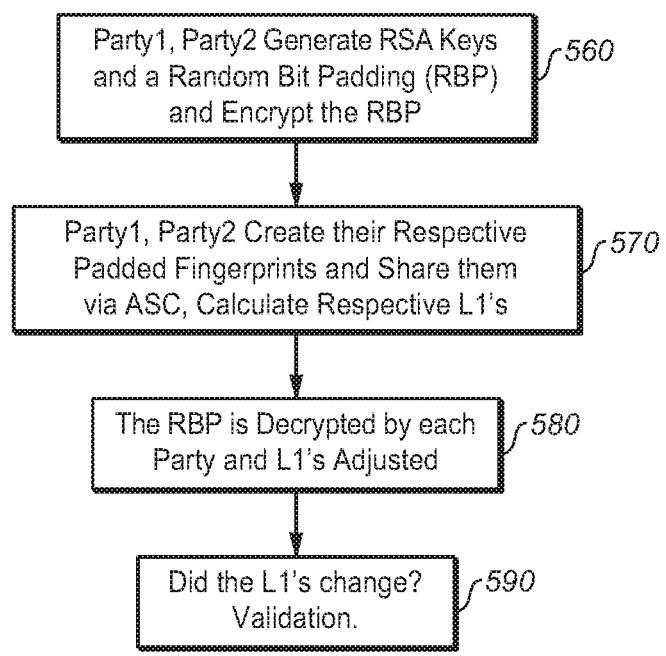
FIG. 5C shows a simplified overview of FIG. 5B.

The four phases to the scheme in FIGS. 5B, 5C are as follows: In a first phase (560) Party1 and Party2 generate respective RSA Keys and random bit paddings (RBP's), the latter of which are encrypted and shared with the other party in a digital lockbox, i.e., which cannot be opened until later. In a second phase (570), Party1 and Party2 create their respective padded fingerprints (using their own RBP's) and share them via ASC, enabling each party to calculate their respective L1's, which are then encrypted and shared in the same manner as the sharing of random bit paddings in the first phase, i.e., in a digital lockbox. In a third phase (580), the opposite parties' random bit paddings and L1's are decrypted by each party (digital lockboxes are opened) and compared with each parties' observed L1, adjusted according to the received random bit pads. The final phase (590) is validation: a check to see whether the L1's did actually match.

In the embodiment shown in FIG. 5B, Party1 and Party2 are replaced by "Alice" and "Bob", respectively.

In general terms, in FIG. 5B, parties to the transaction, Alice and Bob, have respectively a Fingerprint A (561) and Fingerprint B (564), and respectively generate (551), (552) RSA Keys, giving Private Key A (553$a$), Public Key A (554$a$) and Private Key B (553$b$), Public Key B (554$b$). The Public Keys A and B are exchanged (548) between the two parties ("Exchange 1" in the figure).

Alice and Bob have also generated respectively two sets of random bit paddings: Random Bit Padding A1 (557-1), Random Bit Padding A2 (557-2), Random Bit Padding B-1 (558-1), and Random Bit Padding B-2 (558-2). Each of these RBP's is encrypted (555), (556), using respectively Public Key A (554$a$) and Public Key B (554$b$), by the respective parties to create encrypted Random Bit Padding A1 (562-1), encrypted Random Bit Padding A2 (562-2), and encrypted Random Bit Padding B1 (559-1) and encrypted Random Bit Padding B2 (559-2), each of which is sent (549) to the other party ("Exchange 2" in the figure).

In the second phase (570) (wherein "XFP" denotes a padded fingerprint), Alice takes her Fingerprint A (561), merged with respectively Random Bit Padding A1 (557-1) and Random Bit Padding A2 (557-2) to create padded Fingerprint A1 (565-1) and padded Fingerprint A2 (565-2). Bob does the same with Fingerprint B (564) and Random Bit Padding B1 (558-1) and Random Bit Padding B2 (558-2) to create respectively padded Fingerprint B1 (568-1) and padded Fingerprint B2 (568-2).

Now Bob applies ASC (572) to padded Fingerprint A1 and padded Fingerprint B1, to create a value of L1 denoted "L1 B" (582).

Correspondingly, Alice creates L1A (577) via application of ASC (567) to padded Fingerprints A2 and B2.

The two L1's (577) and (584) are not necessarily the same as one another because the fingerprints from which they are formed have likely been padded with different strings of bits.

At the end of the second phase, the two parties exchange (546) these L1 values ("Exchange 3" in the figure). Although not shown in the figure, the parties could exchange encrypted values of L1, encrypted say with Public Keys A and B.

In the third phase (580), Alice sends (545) Private Key A (553$a$) to Bob. Correspondingly, Bob sends (544) Private Key B (576) to Alice. ("Exchange 4" in the figure).

Alice then uses Private Key B in decrypting (571) the encrypted Random Bit Paddings B1 and B2 (559-1) and (559-2), thus liberating Random Bit Paddings B1 and B2 (558-1) and (558-2).

Correspondingly, Bob uses Private Key A in decrypting (578) the encrypted Random Bit Paddings A1 and A2 (562-1) and (562-2), thus liberating Random Bit Paddings A1 and A2 (557-1), (557-2).

Alice then uses her knowledge of all random bit patterns to adjust (573) the two L1's (cf. FIG. 5A) to create two separate L1's, denoted L1A' and L1B' (579), (584). These two values are tested to see whether they are same as one another (581) and, if so, the process stops (585); otherwise, a problem is flagged (583). (If the L1's had been encrypted in phase 2, they would then be decrypted prior to this adjustment.)

Similarly, Bob then adjusts (574) the same two L1's to create two separate new L1's (582), (584), which will be the same as Alice's L1A' and L1B'. These two are tested to see whether they are same as one another (586) and, if so, the process stops (592); otherwise, a problem is flagged (588).

Now, consider two scenarios involving the use of random strings.

Scenario 1: Evil Bob uses a different molecule's bit-string as his private string than the public one he sends to Alice. Without RBP, Evil Bob is forced to guess the L1 of his alternate molecule to Alice's. He has some help here because the L1 he measures against his actual molecule might inform him somewhat about the L1 Alice will see, i.e., if his public and private strings, while different, are relatively similar. The key feature of RBP here is that Evil Bob doesn't learn the actual L1 until after he has recorded it his version, i.e., after the RBP's are revealed. I.e. he never gets a real clue because a random element has been inserted. If Alice asks for repeated measurements, something useful in detecting ASCUS Problem #2, i.e., faked return strings, then this advantage is compounded. In other words, normally Bob would be able to improve his knowledge of Alice's string after each round, but here the RBP values can be reserved to the end of multiple testings, preventing this accumulation of actual knowledge.

Scenario 2: Evil Bob fakes the XOR string he sends back to Alice, either totally, or with the substring belonging to the random portion attached. In the former case he knows exactly what initial L1 Alice will record, in the latter he knows the value she will find when the RBP are revealed and she subtracts this from her L1. Above we described how Alice could use bit-string inversion to test if Bob was constructing fake XOR strings with a 50% probability of success—a test that could be repeated but at the cost of Bob potentially learning more about Alice's string. Consider the situation here. Irrespective of which option he chooses, he does not know what L1 to report to Alice because he doesn't know how many random bits are in his XOR string. The point is that his knowledge of Alice's XOR string no longer helps him: she is not expecting him to get that right, because there are random components to both their strings. She is expecting the numbers to agree AFTER subtraction of these random components, which he does not know. The following are some simple examples, with numbers from Table 1.

TABLE 1

| | XOR String Bits | | |
|---|---|---|---|
| | RBP | Chemical | Net |
| Alice | 3 | 5 | 8 |
| Evil Bob | 5 | 2 | 7 |

The numbers in Table 1 represent the number of bits set to one in each part of the XOR strings that Bob and Alice can decrypt. Of course, these strings are scrambled so they cannot see the breakdown. However, after the opening of the lockbox they will see what they thought the RBP components would be.

Assume that Evil Bob synthesizes Alice's entire bitstring. She sees there are eight bits turned on and, when the lockbox is opened, she will see that three of these bits should have been from the RBP: this is not a number Bob can control or know ahead of time. She therefore believes the correct L1 is five. She also sees that Bob should have had five bits from the RBP in his XOR string; this is also not a number Bob can control or know ahead of time. She reasons, therefore, that Bob ought to be reporting an L1 of ten. Now, given that Evil Bob constructed her string, he knows she will see eight bits, and he sees that there are seven in his own, but how does he know to report an L1 of ten that will satisfy her, given that he does not know either RBP number? Even when he knows how many bits Alice will see he needs to adjust this in his report by the difference of two numbers he does not yet know. Note here how necessary it is to have two different RBPs. If the number of bits from the RBPs were the same then Alice would merely expect the L1 reported by Bob to be the same as hers—something that Bob can easily provide if he fakes her entire string. It is the uncertainty in the difference between the two RBPs that prevents Bob from knowing what false L1 to submit to Alice. A worked example of this procedure is illustrated in FIGS. 6A and 6B.

Figure 6A:
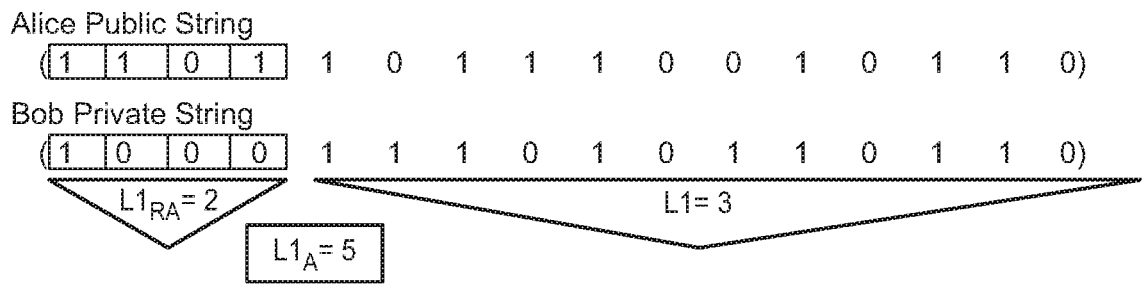
FIG. 6A shows Random Bit Padding and an example of an "honest exchange".
Figure 6A:
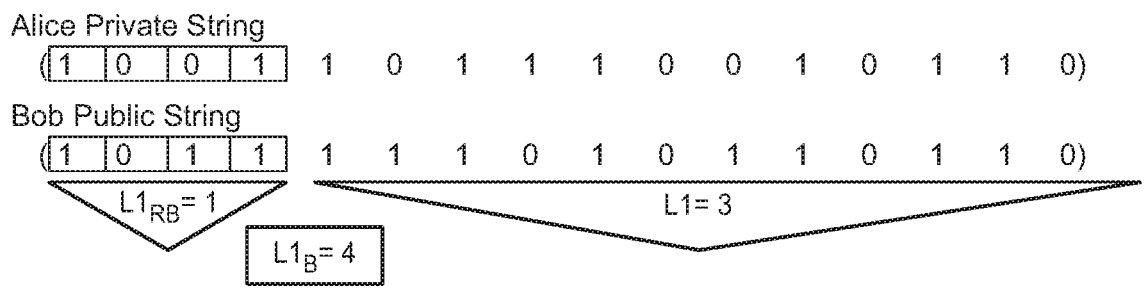
Figure 6A:
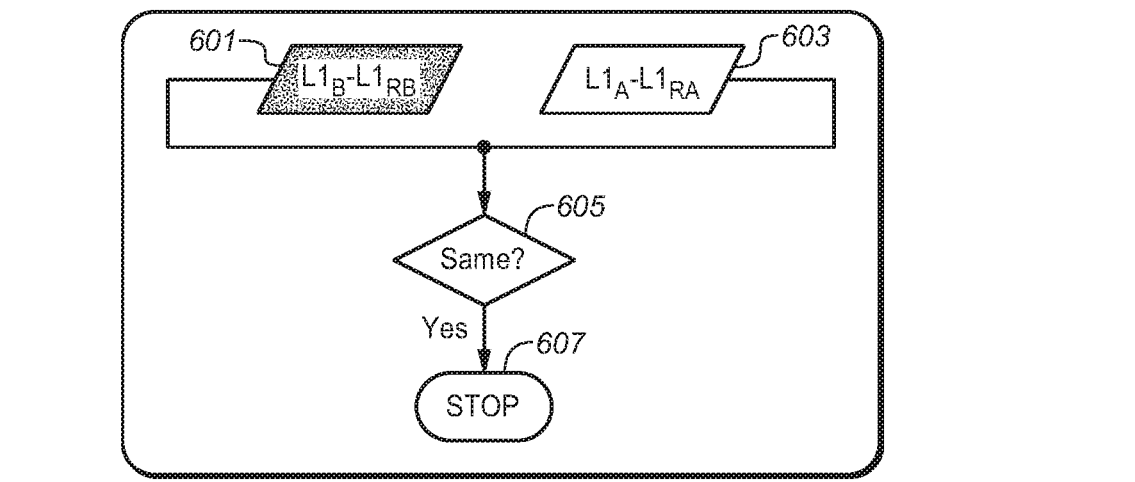

In FIG. 6A, the quantities $L1_B$-$L1_{RB}$ (601) and $L1_A$-$L1_{RA}$ (603), where $L1_A$ and $L1_B$ refer to the total portions of the strings and $L1_{RA}$ and $L1_{RB}$ are for the random bit portions of the strings, are computed. If they are the same as one another (605), then the process stops (607).

Figure 6B:
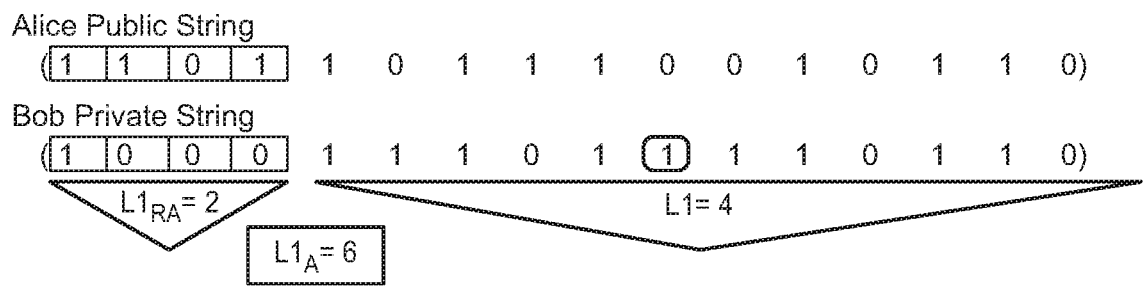
FIG. 6B shows Random Bit Padding and an example of a "dishonest exchange".
Figure 6B:
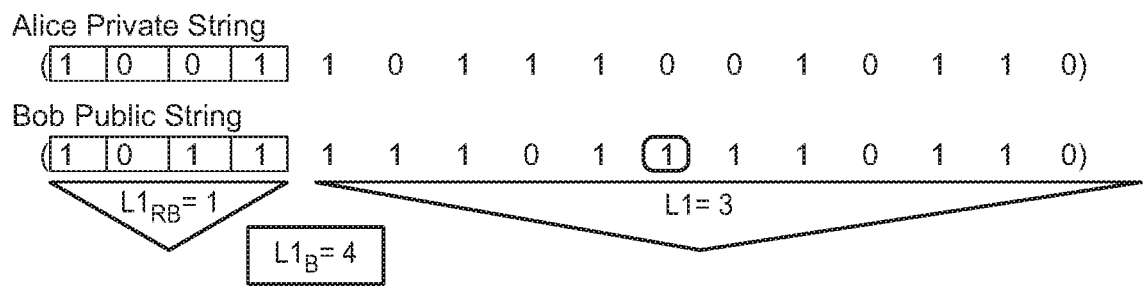
Figure 6B:
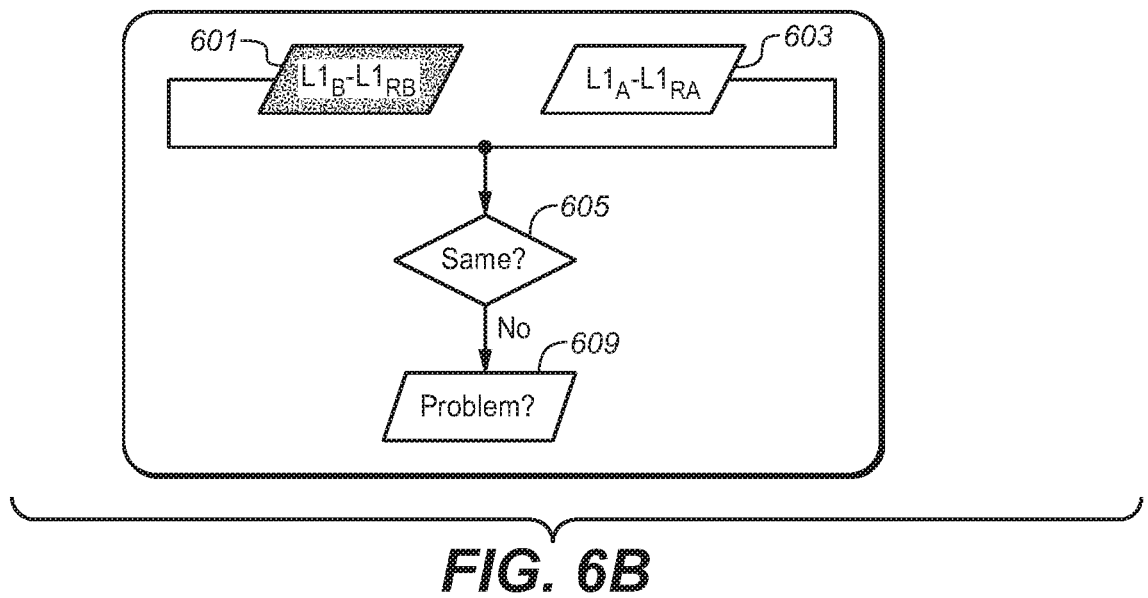

In FIG. 6B, the quantities $L1_B$-$L1_{RB}$ (602) and $L1_A$-$L1_{RA}$ (604) are computed. If they are not the same as one another (606), then the process reports that there has been a problem (608).

The effect of including the additional complexity of an RBP to each bitstring is to make the two methods Bob has to mislead Alice, i.e., (1) use a different bitstring he XORs with Alice's, and (2) completely fake the bitstring he sends back, equally easy to detect by Alice. In effect the difficulty for Bob with path (1) is that he must then successfully guess the difference between the actual similarity of their two bitstrings and the similarity between Alice's bitstring and the one he substitutes for his bitstring. With path (2) he must successfully guess the difference between the actual similarity of their bitstrings and the number of bits he sets to "on" in the fake bitstring he constructs. Both require prior knowledge of the actual similarity of their two, true, bitstrings, something he cannot know in advance (were he to already know this he would not have to engage in subterfuge to find it out). The odds of his mendacity being discovered are directly proportional to the difficulty of estimating either difference. In cases where it is a priori difficult for Bob to guess what Alice holds then the probability of fraud is low. Where a good guess can be made by Bob then his chance of fooling Alice increases. However, if both have the same a priori expectations, then Bob cannot fool Alice very much, i.e., if both have a reasonable expectation of the similarities of their strings, Alice is unlikely to be fooled by Bob representing that their strings are very different. Hence, even in the domain where Bob has a larger chance of misleading Alice, Alice also has a larger chance of at least suspecting the result from the ASCUS procedure.

In general, there are many reasons why parties may wish to keep information secure, or private. Often it is because there are commercial consequences for a breach of security, but sometimes, because of human emotions, people want to maintain privacy in respect of certain information. For instance, consider the process of bidding. One side bids on something the other owns. If there is no emotional attachment to the item being sold there is no downside to disclosing the bid. However, this is often not so. Suppose the item being sold is a business that the owner has worked many years to build into something of worth, and suppose the bid is a "low ball" offer. Not only may the owner refuse, the offer may appear "insulting" and cause friction in future dealings between the parties. In such situations it is common to appeal to the aphorism that "it's only business", but it is never "only business" when it has been one person's life work.

ASCUS gives both sides the opportunity to communicate without risking damage to a relationship. A common rule in the venture community, the "Topp" rule, is that if two sides are within a factor of two in price then a deal might be reached but, if not, it is better to not pursue. If the owner comes up with his or her price, divides it by two, and presents that as their "lowest acceptable bid" and the buyer submits the price at which they would consider the purchase, then ASCUS allows both sides to know which side of this rule they fall. If the prices are not within that range, both may be disappointed but there is no single number for either side to be upset about. If the prices are within the range then it is emotionally safer for both sides to submit real bids and see if a situation exists where the buyer is willing to pay more than the minimum asking price from the owner, at which point a deal is likely even without extensive negotiation. In fact, at this stage the participants have the opportunity to automatically agree to a deal without further negotiation: as they both possess the bid and asking price, but in encrypted form, all they have to do is to exchange their GM encryption keys. By exchanging public keys in the ASCUS process they have automatically set up a "lockbox", i.e., there is no way to change what has already been sent. As such, an intriguing possibility is to establish a prior agreement to split the difference in the bid and asking price, if the former is greater than the latter. Both sides ought to be happy: the owner gets more than they were willing to sell at and the buyer pays less than he or she was willing to pay. This is called the principle of Maximum Mutual Happiness (MMH); it will be revisited in the Examples, hereinbelow, when considering auctions and share exchanges.

Note that the GEL process for range comparison can also be used in dealmaking situations: e.g., if both sides have ranges of prices they might consider, the GEL process will reveal if these ranges overlap at all. Another detail that merits consideration is that of the bid increment because it determines the length of the bitstring. Should the increment be $1, $10, $100, or a greater number? Clearly this will depend on the purchase price. A single dollar in a purchase price in the thousands is unlikely to be important; similarly a $100 increment in a million dollar deal. There is a natural scale to the purchase price and the increment that 'matters'. This can be set by the seller, buyer or negotiated, but mostly likely by the former. In general practice, then, once an increment is determined so must the upper bound, e.g., if the increment is $1 the maximum price is equal to the number of bits if the lower bound is $1. This can be determined in advance, e.g., so that there will be enough bits to give enough dynamic range to the bidding process. Standard numbers can be chosen such that the number of bits and the increment do not give away information about likely sales price except within very large ranges. Typical bitstring lengths that seem practical include 100, 128, 200, 256, 500, 512, 1,000, and 1,024.

Implementational Details

The methods described herein are preferably implemented on one or more computer systems, and the implementation is within the capability of those skilled in the art. In particular, the computer functions for manipulations of bit-strings, such as for representing molecular fingerprints, public private key generation, encryption and decryption operations, can be developed by a programmer skilled in the art. The functions can be implemented in a number and variety of programming languages including, in some cases, mixed implementations (i.e., relying on separate portions written in more than one computing language suitably configured to communicate with one another). For example, the functions, as well as any required scripting functions, can be programmed in C, C++, Java, JavaScript, VisualBasic, Tcl/Tk, Python, Perl, .Net languages such as C #, and other equivalent languages. The capability of the technology is not limited by or dependent on the underlying programming language used for implementation or control of access to the basic functions. Alternatively, the functionality could be implemented from higher level functions such as tool-kits that rely on previously developed functions for manipulating bit-strings and fingerprints.

Where two or more parties separately and independently perform computations, such as encryption operations or manipulations of fingerprints, it is to be assumed that each party independently has access to a computer system that has the capability described herein, even though the various computer systems operated by the various parties need not be identical to one another in power or in the precise details of the manner in which they are programmed.

The technology herein can be developed to run with any of the well-known computer operating systems in use today, as well as others not listed herein. Those operating systems include, but are not limited to: Windows (including variants such as Windows XP, Windows95, Windows2000, Windows Vista, Windows 7, and Windows 8 (including various updates known as Windows 8.1, etc.), and Windows 10, available from Microsoft Corporation); Apple iOS (including variants such as iOS3, iOS4, and iOS5, iOS6, iOS7, iOS8, and intervening updates to the same); Apple Macintosh operating systems such as OS9, OS 10.x, OS X (including variants known as "Leopard", "Snow Leopard", "Mountain Lion", "Lion", "Tiger", "Panther", "Jaguar", "Puma", "Cheetah", "Mavericks", and "Yosemite"; the UNIX operating system (e.g., Berkeley Standard version) and variants such as IRIX, ULTRIX, and AIX; and the Linux operating system (e.g., available from Red Hat Computing).

To the extent that a given implementation relies on other software components, already implemented, such as functions for applying permutation operations, and functions for calculating overlaps and scrambling of bit-strings, functions for calculating public and private keys, and functions for encrypting and decrypting data, those functions can be assumed to be accessible to a programmer of skill in the art.

Furthermore, it is to be understood that the executable instructions that cause a suitably-programmed computer to execute methods for anonymizing a molecular fingerprint, as described herein, can be stored and delivered in any suitable computer-readable format. This can include, but is not limited to, a portable readable drive, such as a large capacity "hard-drive", or a "pen-drive", such as can be connected to a computer's USB port, and an internal drive to a computer, and a CD-Rom, or an optical disk. It is further to be understood that while the executable instructions can be stored on a portable computer-readable medium and delivered in such tangible form to a purchaser or user, the executable instructions can be downloaded from a remote location to the user's computer, such as via an Internet connection which itself may rely in part on a wireless technology such as WiFi. Such an aspect of the technology does not imply that the executable instructions take the form of a signal or other non-tangible embodiment. The executable instructions may also be executed as part of a "virtual machine" implementation.

Computing Apparatus

Figure 9:
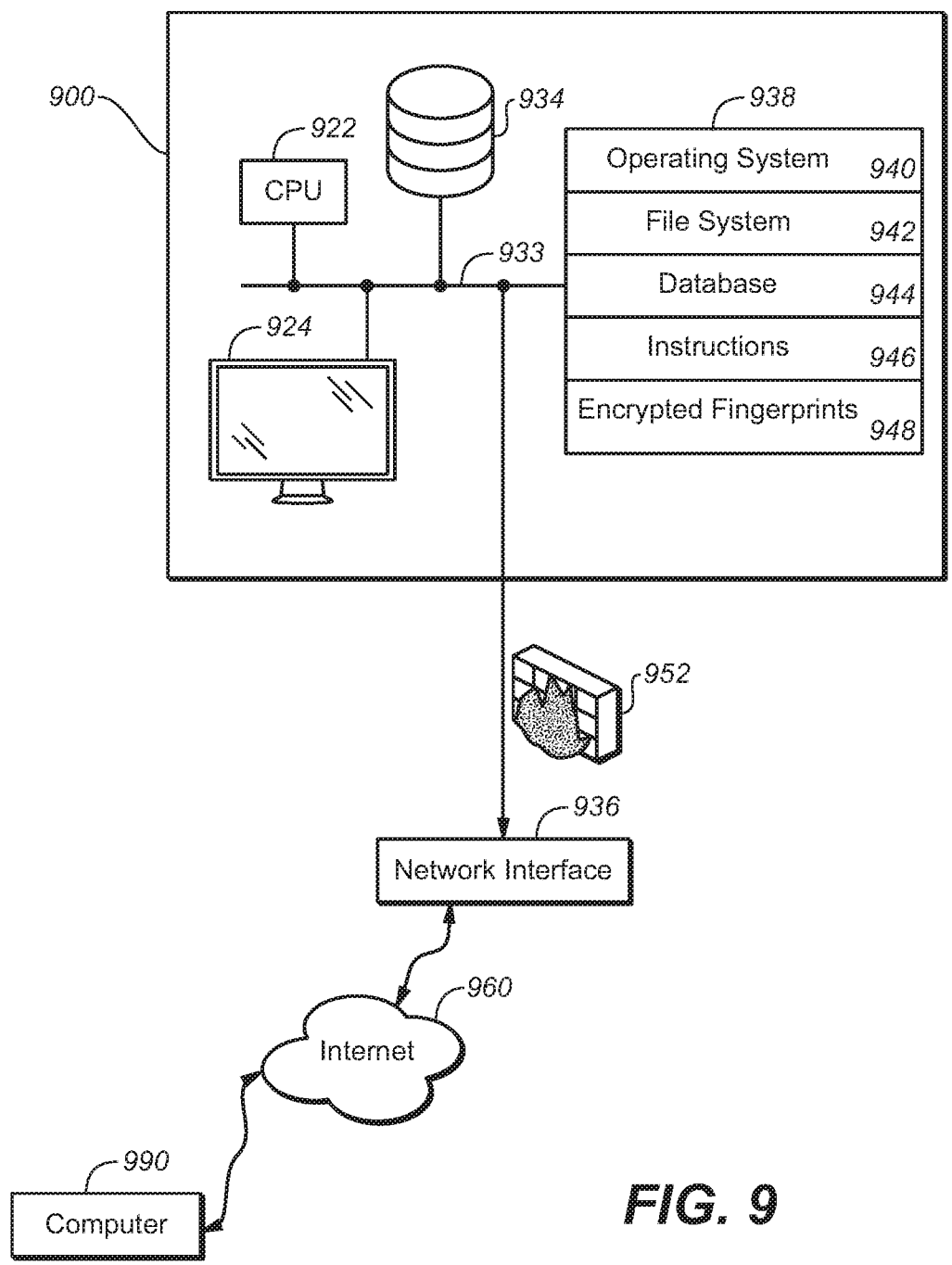
FIG. 9 shows an exemplary computing apparatus for implementing the methods described herein.

An exemplary general-purpose computing apparatus (900) suitable for practicing methods described herein is depicted schematically in FIG. 9. Such a system could be used by any one or more party of the two or more parties who wish to securely share information as described herein.

The computer system (900) comprises at least one data processing unit (CPU) (922), a memory (938), which will typically include both high speed random access memory as well as non-volatile memory (such as one or more magnetic disk drives), a user interface (924), one more disks (934), and at least one network connection (936) or other communication interface for communicating with other computers over a network, including the Internet (960), as well as other devices, such as via a high speed networking cable, or a wireless connection. Network connection (936) can be used for one company to share data (such as data encoded as a bitstring) with another company, where the other company has a computer system (990) (not shown) having similar capability to that computer system (900) and able to receive data to be shared from computer (900). There may optionally be a firewall (952) between the computer (900) and the Internet (960). At least the CPU (922), memory (938), user interface (924), disk (934) and network interface (936), communicate with one another via at least one communication bus (933).

Memory (938) stores procedures and data, typically including some or all of: an operating system (940) for providing basic system services; one or more application programs, such as a parser routine (950), and a compiler (not shown in FIG. 9), a file system (942), one or more databases (944) that store data such as molecular structures or fingerprints, and optionally a floating point coprocessor where necessary for carrying out high level mathematical operations such as for carrying out encryption and decryption operations. The methods of the present technology may also draw upon functions contained in one or more dynamically linked libraries, not shown in FIG. 9, but stored either in memory (938), or on disk (934).

The database and other routines that are shown in FIG. 9 as stored in memory (938) may instead, optionally, be stored on disk (934) where the amount of data in the database is too great to be efficiently stored in memory (938). The database may also instead, or in part, be stored on one or more remote computers that communicate with computer system (900) through network interface (936), according to methods as described in the Examples herein.

Memory (938) is encoded with instructions (946) for at least: carrying out encryption and decryption operations; manipulating fingerprint or bitstrings, such as bitstring representations of molecules stored electronically in a database; and for calculating a similarity score or an XOR operation for pairs of fingerprints. The instructions can further include programmed instructions for performing one or more of generating a random number, and for calculating fingerprint or bitstring representations of the molecular structures stored in the database, as desired. In many embodiments, the fingerprints themselves are not calculated on the computer (900) that performs the encryption or decryption but are performed on a different computer (not shown) and, e.g., transferred via network interface (936) to computer (900). In the case of generating a random number, or a pseudo-random number, the process is preferably not solely based on a mathematical formula or process. Preferably the choice of a random number, or the seed for a random number generation method, is obtained from a fluctuating quantity in the real world, such as an electrical potential within the computing device being employed.

Various implementations of the technology herein can be contemplated, particularly as performed on one or more computing apparatuses (machines that can be programmed to perform arithmetic) of varying complexity, including, without limitation, workstations, PC's, laptops, notebooks, tablets, netbooks, and other mobile computing devices, including cell-phones, mobile phones, and personal digital assistants. The methods herein may further be susceptible to performance on quantum computers. The computing devices can have suitably configured processors, including, without limitation, graphics processors and math coprocessors, for running software that carries out the methods herein. In addition, certain computing functions are typically distributed across more than one computer so that, for example, one computer accepts input and instructions, and a second or additional computers receive the instructions via a network connection and carry out the processing at a remote location, and optionally communicate results or output back to the first computer. Thus, the methods herein are particularly susceptible to being performed in cloud-computing environments, where data is stored, temporarily or permanently, on one or more remote hosted arrays of data storage in a secure fashion so that the data is only visible to a specific account holder. In cloud computing environments, processing power of arrays of remote processors can also be harnessed to carry out manipulations on data stored in the cloud environment, such that the results of such manipulations are only known to a specific account holder and/or those it gives permission to access the manipulations.

Control of the computing apparatuses can be via a user interface (924), which may comprise a display, mouse, keyboard, and/or other items not shown in FIG. 9, such as a track-pad, track-ball, touch-screen, stylus, speech-recognition device, gesture-recognition technology, human fingerprint reader, or other input such as based on a user's eye-movement, or any subcombination or combination of inputs thereof.

In one embodiment, bids can be represented as QR-codes and displayed on, e.g., a mobile-phone interface; such codes can be swapped back and forth between individuals by optical scanning of each other's devices' screens. In this way any compromising of a means of communication, e.g., wireless, internet, near-field communication, can be avoided.

The manner of operation of the technology, when reduced to an embodiment as one or more software modules, functions, or subroutines, can be in a batch-mode—as on a stored database of molecular structures or fingerprints, processed in batches, or by interaction with a user who inputs specific instructions for a single molecular structure or fingerprint.

The similarity calculations created by the technology herein, as well as the anonymized fingerprints themselves, can be displayed in tangible form, such as on one or more computer displays, such as a monitor, laptop display, or the screen of a tablet, notebook, netbook, or cellular phone. The similarity scores and fingerprints, can further be printed to paper form, stored as electronic files in a format for saving on a computer-readable medium or for transferring or sharing between computers, or projected onto a screen of an auditorium such as during a presentation.

Certain default settings can be built in to a computer-implementation, but the user can be given as much choice as he or she desires over the features that are used in calculating the similarity of the fingerprints.

EXAMPLES

Example 1: Comparing Lists of Objects

Memory/Bandwidth Requirements

The property of the GM encryption method that single bits are expanded to the level of security required, has a significant impact on the practical application of the ASC or ASCUS method to comparing lists of molecules (such as between two companies), in terms of the computing resources required. There are two principal cases: first comparing a single molecule to a list (one to many), and then comparing two lists of molecules (many to many). In both cases, the need for network bandwidth could be avoided by simply arranging for a physical meeting between representatives of the two companies, each of whom brings their respective encoded collections on a device. By establishing, e.g., a fast Gigabit switch between the two, the need for network resources would be obviated. Nevertheless in the context of remote dealing the following considerations would apply.

One to Many

Suppose each fingerprint has about 1,000 bits, then the size of the encrypted string will depend on the level of security required. Today, 256-bit encryption is typical for commercial transactions. It is believed that the U.S. National Security Agency (NSA) can routinely crack such levels of encryption, but only by dedicating computing power beyond that of many small countries. It can therefore be assumed that 256 bits are enough, although, should the need arise, it is almost certain that 1,024-bit security is beyond any resource on Earth today. At 256-bit security each molecular fingerprint will be 32 kBytes long. A typical corporate collection might be of the order of a million compounds. Therefore, such a collection, when encrypted, is 32 GBytes in size. This is not an unmanageable size to store, given today's hard disk capacities. However, the ASC method requires complete transmission of both the public fingerprint and the XOR fingerprint, and this means that a complete transference of the comparisons of a single molecule with a corporate collection requires the bidirectional transmission of those quantities. That is, a 32 GByte sized file needs to be sent and retrieved for EACH comparison. Even with very fast internet connections this is likely to take the order of 12 hours per transfer (assuming a rate of 1 MByte per second)! The only ways to reduce this number are to either reduce the level of security, e.g., to a more modest 128 bits, or to reduce the number of compounds compared, which can reduce the size of the file by a fact of two or more.

A reasonable approach to the latter is to cluster compounds. A corporate collection does not contain a million totally diverse compounds. If the compounds were clustered to a similarity threshold equivalent to "very similar to a chemist", there would probably be about 20 k clusters. Another advantage of clustering would be that actual compounds to not have to be compared: the company could select bit patterns that represent centers of clusters of compounds, as opposed to representative compounds. As such, the actual fingerprints would represent "idealized" molecules. The search could then be refined based on the similarity discovered of the target to these clusters. Including a reduced level of encryption of 128 bits (still considered substantial) would mean the time for a comparison would be of the order of 10 minutes.

Many to Many

Suppose each company has 10 k cluster centers to compare: this is a total of 100M (i.e., $10^8$) comparisons, each requiring the transfer of 32 kB of data. This is 3.2 TBytes of data that needs to be sent back and forth. The fastest way to do this today is with a secure hard drive and a courier service such as FedEx, which may be a perfectly reasonable option for such an operation, because this may be a project between two companies that has a time-scale of weeks or months. Even with today's broadband connections, fewer than 1% of individual users are downloading 1 TByte or more of data in a given monthly billing cycle.

The core issue is in the "round-trip" nature of ASC. Typically (i.e., without the requirement of encryption) such a large-scale comparison operation could be filtered, i.e., only those molecular similarities deemed significant would have to be sent back. However, in ASC what the similarities are is not known until they are shipped back to the source of the 'public' strings, so there is no way to circumvent the transmission of the full similarity matrix between the parties. (The computation of pairwise similarities between m molecules from one set, and n molecules from a second set, produces a mXn similarity matrix, where the (i,j) element is the similarity of molecule i with respect to molecule j.) As such, ASC or ASCUS is not an ideal technology for large-scale all-with-all (many to many) comparisons.

Other Problems with Large-Scale Comparisons: One to Many

Even if there were not bandwidth and possible disk-space limitations with the ASCUS scheme, there remains the fundamental question of the information released when the similarity of one compound to many is considered. For instance, by comparing the target fingerprint with a series of fingerprints each having just one bit, the owner of the "Many" fingerprints could decode exactly what the "One" fingerprint contains, which defeats the purpose of the comparison.

"One to Many" can be made secure against this type of attack by the owner of the One compound reorganizing the order of the encrypted XOR strings returned to the owner of the Many. As such, if the latter had included "one-bit" strings he or she would not know which bit they now refer to. As such the transmission of information has shifted from: "Which compounds (strings) in the Many are similar to the One", to "Are there any strings that are similar, even if I do not know which ones". This is still a valuable, secure, comparison.

Additional Protections for Many to Many Comparisons

Just as a one-to-many comparison carries the risk of revealing too much information (because each secure comparison delivers at least one bit of information), so too does a many-to-many comparison for the same reason. One party to the transaction could "salt" their list of bitstrings with strings chosen only to eludicate the position of bits in the other party's bitstrings. However, the same approach as with one-to-many comparisons can be taken to eliminate this risk. In essence, each party scrambles the order of the "reply" bitstrings sent to each other.

For instance, suppose Alice and Bob each have two bitstrings: A1 and A2, belonging to Alice, and B1 and B2, belonging to Bob. Alice sends A1 to Bob in encrypted form. Bob calculates the XOR of A1 with B1 and B2, thereby generating two scrambled, encrypted strings EB1 and EB2, and randomizes the order in which these are returned, without telling Alice the ordering. That is, EB1 may be returned first, and EB2 second, or EB2 first and EB1 second. Then, Alice counts up the number of bits in the strings she receives and returns these two numbers to Bob, also in a random order. That is, such that Bob cannot tell if the number of bits different between A1 and B1 is the first or second number that Alice has sent. They then both repeat this procedure for Alice's bitstring A2. At the end of this procedure each party is in the possession of four numbers, representing the number of bits different between A1 and B1 (=N1:1), A1 and B2 (=N1:2), A2 and B1 (=N2:1), and A2 and B2 (=N2:2). However, neither Alice nor Bob knows the second index for each of these numbers. That is, neither party can tell if (N1:1) is in fact (N1:2), or if (N2:1) is really (N2:2).

If these four numbers were represented as a 2×2 matrix, with Alice's strings representing the rows of that matrix, the matrix would be described as "row scrambled" (the values within each row have been scrambled). Now, this is an asymmetric arrangement: only Bob's "index" is scrambled, not Alice's. The information inherent in this situation is that Alice and Bob know if there are compounds in Bob's collection that are similar or dissimilar to each compound in Alice's collection, but not which ones they are.

Naïvely, it might seem that to make this situation symmetric, all that would have to be done would be to repeat the process, but this time have Bob and Alice swap roles (Bob takes Alice's role and she his). Doing this would, then, return a matrix that is "column scrambled", i.e., now they would both know if there were compounds in Alice's collection that were similar or dissimilar to a given compound in Bob's collection, but again just not which compounds.

However, a little reflect shows that if Alice and Bob are both in possession of copies of both the "row scrambled" and "column scrambled" matrices then they could potentially work out the correct row and column indices. For instance, suppose the row scrambled matrix and the column scrambled matrix are as follows:
Row scrambled:

$$\begin{bmatrix} 4 & 6 \\ 2 & 8 \end{bmatrix}$$

Column scrambled:

$$\begin{bmatrix} 6 & 2 \\ 4 & 8 \end{bmatrix}$$

Since the count of "4" is associated with A1 from the row scrambled matrix it must still be so for the column scrambled matrix, i.e., the order of the first column, supposedly scrambled, must be A2, then A1. This means that the order of the first row in the row scrambled matrix must be B1 followed by B2. Continuing this process, each matrix can be descrambled as follows:
Row unscrambled:

$$\begin{bmatrix} N1:1 & N1:2 \\ N2:2 & N2:1 \end{bmatrix}$$

Column unscrambled:

$$\begin{bmatrix} N1:2 & N2:2 \\ N1:1 & N2:1 \end{bmatrix}$$

As such, for a symmetric comparison the final exchange has to be avoided, i.e., Alice must never send Bob her row-scrambled matrix, and Bob must never send Alice his column-scrambled one. That way, each party has information as to whether there is a compound in each other's collection that is similar or dissimilar to a known compound in each's collection, but neither party knows which compounds are similar to one another.

Finally, there is a mechanism for a fully symmetric comparison that avoids the need for each side to have differential information. Suppose Alice sends Bob both encrypted A1 and encrypted A2. Bob then composes the XOR'd encrypted strings for his B1 and B2, giving him four strings. But suppose Bob randomizes the order in which he applies B1 and B2 to A1 and A2, i.e., he randomizes row and column. On receiving the four encrypted XOR strings back from Bob, Alice performs the bit count operation on each string but what she sends back is also row and column scrambled, i.e., they both possess a row and column scrambled matrix. This matrix then contains information about their respective collections, such as how many compounds are similar and how many are dissimilar, but neither knows to which of their compounds this appellative can be applied. Although this data only represents the distribution of similarities between collections, it may still be useful to know. For example, do Alice's and Bob's libraries look like each other or not? If not, then perhaps it would be beneficial to arrange for more in-depth comparison to see if they would want to swap compounds to enrich the diversity of each set.

Cloud-Based Many-to-Many Comparison

One of the problems involved with large scale many-to-many comparisons is that they generate very large datasets. For instance, the $3.2 \times 10^{12}$ bytes (3.2 TBytes) required to capture, in encrypted form, the pair-wise similarities of two collections of 10,000 compounds (as referenced hereinabove). If the two collections were instead one million compounds each, which is not an unreasonable number for pharmaceutical collections, then this number increases to 32 PetaBytes ($3.2 \times 10^{16}$ bytes) of storage. Relatively few organizations will have access to such storage, and the transmission of such a quantity of data would be prohibitive, even on current Internet infrastructure.

However, in recent years hosted computer resources, so-called "cloud" computing centers, have become economically viable. Even storage requirements as vast as multi-petabytes are available for rent. This does not entirely solve the inherent problems of large-scale many-to-many comparisons because the traditional concept of homomorphic encryption requires the transmission of the final, "result", files (still in encrypted form) to either party, i.e., the transmission of petabyte files via public infrastructure such as the internet.

However, if some form of decryption is allowed in the cloud, such as calculating the difference in bit counts between all pairs of strings, then the transmission requirements become tractable. Sending the $10^{12}$ bit-count comparisons between two collections each of one million compounds is entirely possible with a fast internet connection. Many large companies have gigabit switches that could accomplish this in an hour or so.

Accordingly, a method herein for securely comparing information between a first party and a second party without revealing the actual information, involves the following: The first party creates a first fingerprint from a first piece of data. The second party creates a second fingerprint from a second piece of data. The first party then generates a first set of GM keys with associated public keys and private keys, and encrypts the first fingerprint with the public keys to create an encrypted first fingerprint. The first party then uploads the encrypted first fingerprint to a first secure cloud account that only it has control over, and then sends the public keys to the second party. Likewise, the second party encrypts the second fingerprint with the public keys to create an encrypted second fingerprint and uploads the encrypted second fingerprint to a second secure cloud account that only it has control over. The first party then gives the second party "read" privilege for the first encrypted string on the first cloud account. (This is equivalent to sending its encrypted string to the second party.) The second party performs an XOR operation on the encrypted first fingerprint and the encrypted second fingerprint, thereby creating an encrypted fingerprint XOR in the second cloud account. The second party then scrambles the encrypted fingerprint XOR, thereby creating a scrambled encrypted fingerprint XOR in the second cloud account. The second party then gives "read" privilege for the scrambled encrypted fingerprint XOR to the first party. (Again, this is equivalent to sending its scrambled, XOR'd encrypted strings to the first party.) The first party runs a program on the scrambled encrypted fingerprint XOR to evaluate the number of bits that are turned on and stores the encrypted number in the first party's cloud account; and finally, the first party downloads the encrypted result from the first cloud account, decrypts it on its computers, thereby learning the level of similarity between the first and second fingerprints.

The main drawback with this approach, though, is that one party has to upload a program to the cloud resource that enables the bit counting of an encrypted string. If a hostile entity had access to this program then they could use it to decrypt any encrypted string, e.g., by applying it to the collection of encrypted strings representing the collection of either party currently stored on the cloud. (For example, such a party could take each bit of an encrypted string at a time, and feed it to such a program and have returned a decrypted bit count of one or zero). The two parties can protect against this by agreeing to some random scrambling of bits within each string before storing them in the cloud, i.e., so that any decryption is of much less value. However, this doesn't prevent a third party in possession of a decryption method from selling it to one of the communicating parties. One possible approach to mitigate this risk would be to have the result of any cloud-based bit-count decryption itself be encrypted. If such a result cannot be decrypted by anyone but the owner of the decryption program, and if it is smaller than the original bitstring, then it would be possible to mitigate the problems involved in returning the entire set of encrypted strings to one party. For instance, if a string is 1,024 bits long then it only takes 10 bits to describe how many bits are turned on, i.e., a compression factor of 100. If the same method of encryption described here were used, there is still an expansion of this by a factor of 128 or 256, but even given this expansion the transmission of the entire pair-wise matrix would be possible, either on physical media, or by a fast internet connection in a matter of days.

Using the GM method to encrypt the number of bits in common would still be challenging to most computing resources because the GM method uses such a large number of bits. For example, to store a 10-bit number it takes 10*128 bits if we are using 128-bit security or 10*256 bits for 256-bit security. A simpler method would be to generate a random bit-string of, say, 100 bits, then set the first 10 bits of this string to be the 10 bits representing the "bits in common" count. These 100 bits can then be encrypted using any scheme, e.g. RCA, and stored. All that's necessary is that the encryption method doesn't produce the same "message" every time for the same bit count, otherwise an adversary with access to this program (e.g., the owner of the cloud resource) could just see what the encrypted message is for a string with no bits turned on, with one bit turned on, with two bits turned on, etc., and then just compare this set of messages to whatever the program produces for an arbitrary string. If there are $2^{}90$ (=$10^{}27$) different possible messages for "no bits turned on" then the adversary has no hope of capturing even a tiny fraction of these messages. With this level of compression, i.e., 100 bits per bit count results, the full N*N matrix of pair comparisons is only $10^{**}14$ bits, i.e., ~10 Tbytes. The courier cost for sending this amount of data would be reasonable even today.

Example 2: Comparison of Activity Profiles

In Example 1, a set of chemical structures was compared where each bit in the fingerprint represents a feature of molecular structure. By expanding what is represented by a fingerprint, other properties of pairs of molecules can be compared. For instance, one extension is where the bits in the fingerprint represent activity in an assay. If activity is an either/or characteristic (e.g. active/inactive) then the extension is straightforward: the activity fingerprint simply places a "1" in the position in the fingerprint reserved for "active", otherwise a "0". If, instead, activity is quantified into bands or ranges, this can be accommodated by expanding the fingerprint. For example, an activity in a particular assay can be quantized into eight, log unit, ranges:

{<1 nM}, {1 nM, <10 nM}, {10 nM, <100 nM}, {100 nM, <1 μM},
{1 μM, <10 μM}, {10 μM, <100 μM}, {100 μM, <1 mM}, {>1 mM}

Suppose a compound has an activity of 50 nm, i.e., falling into the third category. This can be represented as the following short bitstring, where each position in the bitstring corresponds to one of the eight ranges:

| 1 | 1 | 1 | 0 | 0 | 0 | 0 | 0 |
|---|---|---|---|---|---|---|---|

In this case, the first three bits are set to "1". If this bitstring is compared to that for another compound that has an activity of 2 mM, which, then has a bitstring of:

| 1 | 1 | 1 | 1 | 1 | 1 | 1 | 1 |
|---|---|---|---|---|---|---|---|

(In both these bitstrings, ranges of bits are set so that the actual difference between the strings can be obtained, rather than a simple determination of whether the two strings represent the same category as one another.) Then the L1 distance between these strings will be 5, representing the number of categories difference between the two molecules for this activity. If there are two measured activities for each molecule, e.g., for the first molecule considered: 50 nm to a first kinase, and 5 μM for a second kinase, this can be represented by joining two such bitstrings, thus (the appended string shown with underlined bits):

| 1 | 1 | 1 | 1 | 1 | 1 | 1 | <u>1</u> | <u>1</u> | <u>0</u> | <u>0</u> | <u>0</u> | <u>0</u> | <u>0</u> | <u>0</u> |
|---|---|---|---|---|---|---|---|---|---|---|---|---|---|---|

If the second compound has an activity against the second kinase of 5 nM then its composite string will be (again, the appended string having underlined bits):

| 1 | 1 | 1 | 1 | 1 | 1 | 1 | 1 | <u>1</u> | <u>1</u> | <u>0</u> | <u>0</u> | <u>0</u> | <u>0</u> | <u>0</u> | <u>0</u> |
|---|---|---|---|---|---|---|---|---|---|---|---|---|---|---|---|

The L1 between these two strings is 5+3=8. Hence ASC or ASCUS will reveal the average L1 difference in activity categories, i.e., 4. Since both sides know they have a compound that is quite active against one kinase they can assume that the other has a compound with activity against a different kinase. If the average difference had been quite low then they would have assumed that the kinase profiles for both kinases were fairly similar.

This concept of comparing activity profiles can be extended to arbitrarily many assay results. Its utility will typically be to find either: (A) compounds that have similar chemistry but different activity profiles (Low Chemical L1 but High Activity L1), or (B) compounds that are quite different chemically but have a very similar activity profile (High Chemical L1, but Low Activity L1), i.e., it is extremes in the L1 that are useful.

Naturally, properties can be represented as finely as required in terms of categories. They can also be grouped together to give group-wise activity similarities. For instance, perhaps there is a kinase screen but also a screen for GPCR's. Each will then give a separate, indicative L1 difference.

As an alternative to using the bit representations as above which give a measure of the actual difference between two properties, the GEL fingerprint process can also be used to determine if a single property is higher, lower or the same, for each (or a given) category. For instance, suppose it is needed to compare two compounds chemically but also to ascertain if the solubility of one compound is higher than another. The above fingerprints only give the degree of the difference, not the direction (greater or smaller) of that difference. The GEL formalism above, however, allows for the latter. Used on its own, in conjunction with chemical fingerprints, two researchers can ascertain if two compounds are similar but one has a better solubility. In lead optimization of compounds in drug discovery it is important to optimize many properties simultaneously and most of the synthesis of compounds revolves around improving properties, i.e. in the direction of changes in properties.

For example, two companies might be working on similar molecules but be in a situation where different physical properties are lacking—perhaps the solubility is too low on one side and metabolic clearance too high on the other. Using the GEL format along with the chemical similarity L1, the two sides might decide to share their chemical information to see if they can learn what is responsible for the individual flaws, i.e., both have a chance to improve their compounds if they know this situation exists. And, once again, this can be done without revealing actual compounds or actual physical properties.

Finally, the metric between two strings that has been considered is the "city block" or L1 distance. However, if two lists, or vectors, of numbers are being compared it is more usual to form the L2 distance, which is the sum of the squares of the distances.

As stated hereinabove, when the entries in the list or vector are only 1's and 0's there is no difference between L1 and L2 (1*1=1, 0*0=0). However, if the lists of activities represented as above were considered to be ordered categories, there is a choice of which metric to calculate. To see this, consider the above example where there are two properties represented.

| 1 | 1 | 1 | 0 | 0 | 0 | 0 | 0 | <u>1</u> | <u>1</u> | <u>1</u> | <u>1</u> | <u>1</u> | <u>0</u> | <u>0</u> | <u>0</u> |
|---|---|---|---|---|---|---|---|---|---|---|---|---|---|---|---| and

| 1 | 1 | 1 | 1 | 1 | 1 | 1 | 1 | <u>1</u> | <u>1</u> | <u>0</u> | <u>0</u> | <u>0</u> | <u>0</u> | <u>0</u> | <u>0</u> |
|---|---|---|---|---|---|---|---|---|---|---|---|---|---|---|---|

The ASC/ASCUS process will produce a XOR vector, as follows:

| 0 | 0 | 0 | 1 | 1 | 1 | 1 | 1 | <u>0</u> | <u>0</u> | <u>1</u> | <u>1</u> | <u>1</u> | <u>0</u> | <u>0</u> | <u>0</u> |
|---|---|---|---|---|---|---|---|---|---|---|---|---|---|---|---| which can then be scrambled:

| 1 | 1 | 0 | 0 | 1 | 1 | 1 | 0 | 1 | 0 | 1 | 0 | 0 | 0 | 1 | 0 |
|---|---|---|---|---|---|---|---|---|---|---|---|---|---|---|---| showing that L1=8, i.e., 8 bits are set.

But suppose the strings are instead scrambled within their subvectors, i.e.,

| 0 | 0 | 1 | 1 | 1 | 0 | 0 | 0 | <u>0</u> | <u>0</u> | <u>0</u> | <u>1</u> | <u>1</u> | <u>1</u> | <u>1</u> | <u>1</u> |

The reader now sees that there are L1 distances of 5 and 3 embedded herein but does not know which properties they refer to. Furthermore, given the individual distances the L2 distance (squared) can be calculated as 5*5+3*3=34. Hence the ASC/ASCUS method also allows for L2 distances between vectors of properties, where each property difference is represented as a bitstring, but where the order of the properties is lost. Clearly this process will work best if the number of properties is large.

Example 3: Shared Models

The problem of whether two companies could collaborate towards making a joint prediction model without revealing their compounds is actually straightforward without the need for any ASC methods. Typically such prediction models are made by pooling datasets but where each molecule is represented only by a set of properties used in the model, plus the quantity for which prediction is required. Then standard methods, such as QSAR, are applied to come up with a (typically highly parameterized) model for that quantity.

However, there is a second class of models that derive not from a set of properties but from similarities between molecules in some property space. For instance, fingerprint differences form such a class. Each bit in the fingerprint is not treated as a different property (for inclusion in some QSAR method); rather the distance is taken as a holistic, pair-wise property. For instance, a kNN method ("k" Nearest Neighbors) will make a prediction for a new compound by averaging the properties for k neighbors. These models are harder to share because the distance to each new molecule must be calculated. For example, if company A wants a prediction on their new molecule they have to disclose that molecule to company B to receive input for the prediction from any molecules in B's collection that lie close in structure and/or properties to A's new compound. Also, in weighted distance schemes, for instance in the Kriging method, the distances between all molecules to date (i.e., the distance between all of A's compounds and all of B's) are required. But, of course, this situation is ideal for the ASCUS approach, i.e., calculating the similarity between two sets of molecules. As such, a unified model that uses resources from two—or more—companies is practical without revealing molecular structures.

Figure 7A:
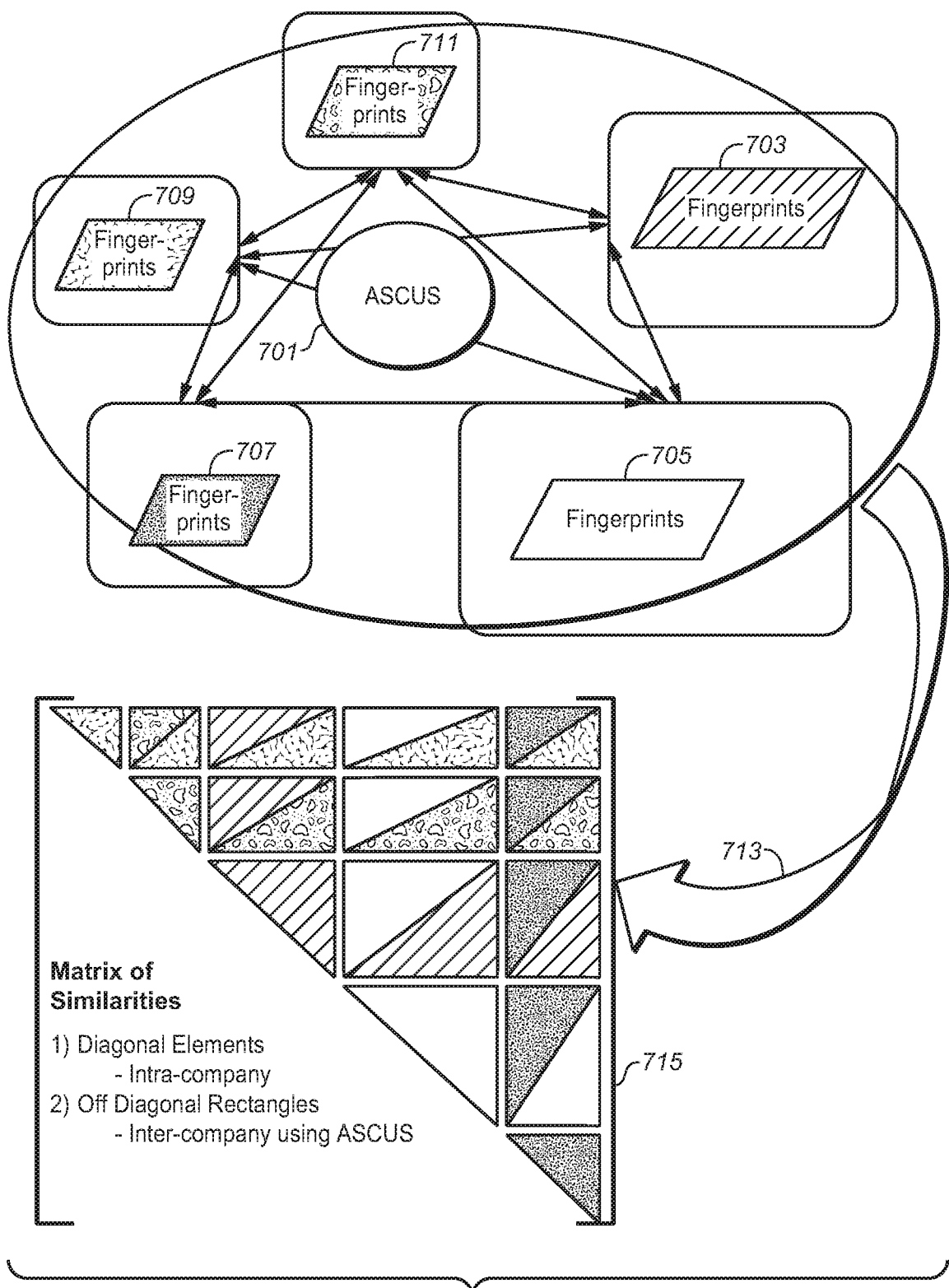
FIGS. 7A, 7B show a method for comparing molecules in distance space. Specifically.
Figure 7B:
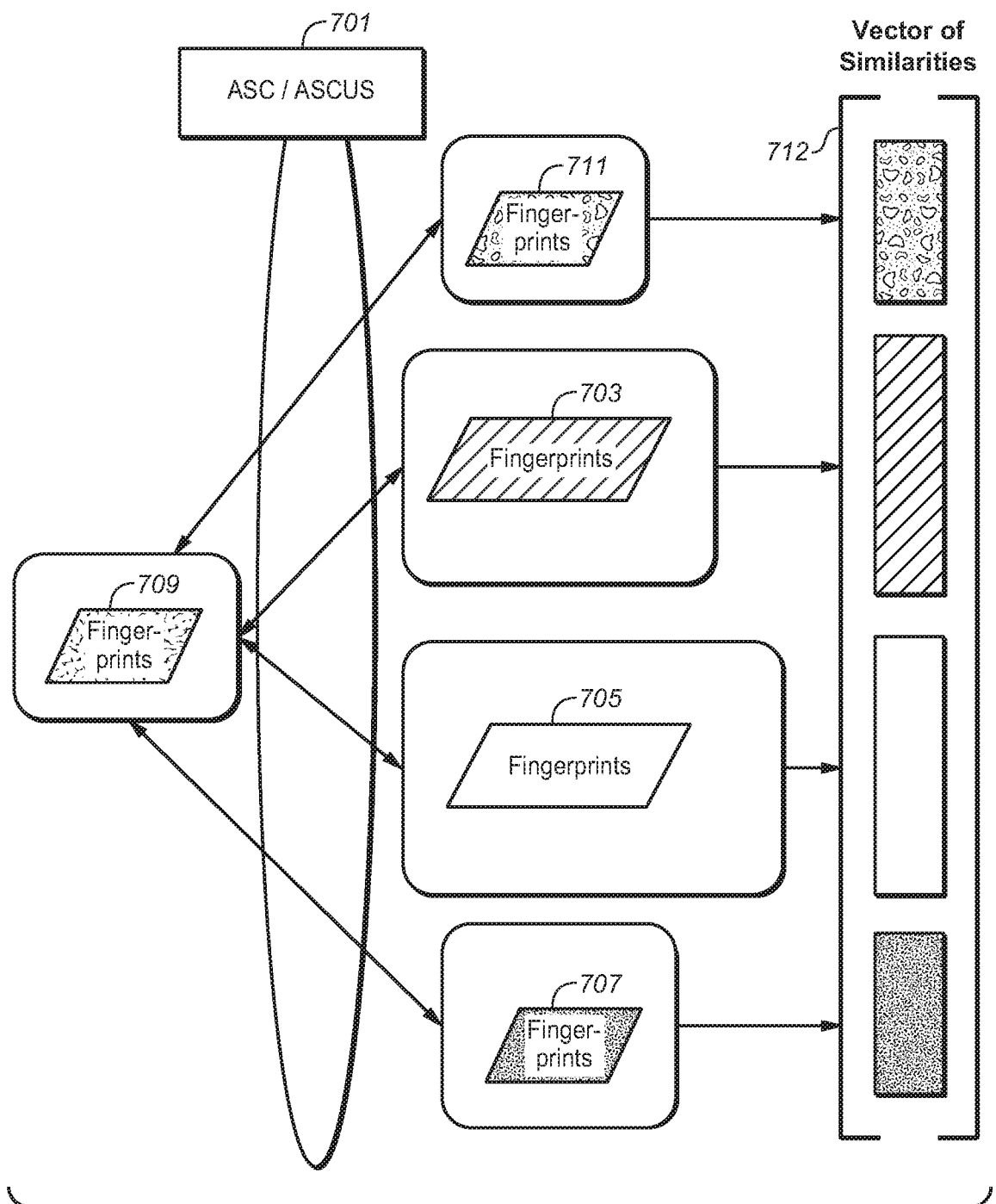

The procedure is illustrated in FIGS. 7A and 7B. The starting point are various sets of fingerprints, denoted as (703), (705), (707), (709), (711) in FIG. 7A. The sets need not be the same size as one another, as represented by the different sized parallelograms in the figure. The ASCUS methodology (701) can be used to compare (pairwise) the various sets of fingerprints, as shown in the top panel of FIG. 7A. The first step involves each contributor generating (713) the matrix of similarities (715) between their compounds. These form the central portion of the global similarity matrix. The second part is the use of ASCUS to form the off-diagonal elements of this matrix, i.e., the similarity of each company's compounds to each other's set. As illustrated, the contributions do not have to be equal. It is usual to talk of a "similarity" matrix, even though the quantities calculated may be differences, as in the ASCUS L1 distance. Each contributor has access to one row of this matrix, i.e., the similarity of its compounds to each other and to those of every other company. It is assumed that these rows are then shared between the contributors such that each ends with a full matrix. Then, if a new compound needs a prediction, the vector of distances needs to be calculated from it to that from each company. To make a prediction, the complete vector (712) is required, which means that each company has to contribute a part, as illustrated in FIG. 7B for the fingerprint set (709), compared using ASC/ASCUS against each of the other sets. In this second step, only the submitting company has the whole vector, but then there is no reason that the prediction needs to be known beyond the submitting company. As such, the asymmetric process (ACS) is the appropriate method to apply to generate the vector of similarities.

The vector of similarities is then used along with the matrix of similarities to predict the property of interest. Note that the matrix is only of use for methods such as Kriging, which take into account the correlation between distance and variance of properties. Methods such as kNN only require a vector of similarities to be calculated, i.e., the second step is all that is required.

Example 4: Shape Comparison

So far the application of the ASC/ASCUS process has been limited to physical properties, such as lists of activities, or fingerprints representing chemical patterns or properties. However, the approach can also be adapted to the comparison of the three dimensional shapes of molecules. Given an orientation of a conformation of a molecule, a lattice of regularly spaced points can be superimposed on the molecular structure, and each point given a value of one (inside the molecule) or zero (outside the molecule). This lattice of 1's and 0's can now be turned into a vector of 1's and 0's.

For example, suppose the lattice extends from the range of $\{x=-10\ Å,\ x=10\ Å\}$, $\{y=-10\ Å,\ y=10\ Å\}$, $\{z=-10\ Å,\ z=10\ Å\}$ and that lattice points are rectilinear with a separation of 1 Å. This means there are 21*21*21=9261 points on the lattice. A vector can be formed from this grid by taking first the 21 values along the line (y=-10 Å, z=-10 Å) from x=-10 Å to x=+10 Å, then 21values from (y=-9 Å, z=-10 Å) etc. This ordering of a lattice into a vector means that now two vectors can be compared that represent two shapes in a given orientation. In addition, three other orientations can be compared by rotating the grid 180 degrees around the x- and y-axes. These rotations correspond to changing the order of the bits within the fingerprint in regular ways, i.e., four different orientations can be compared without the need to remap the shape to a new lattice. Of course, such alternative orientations and translations relative to the grid can also be constructed and compared, e.g., a 'canonical' set of orientations might be those that align a molecule's moment of inertia to the Cartesian axes, but other orientations can also be considered.

Finally, it should be noted that comparison of shapes has been illustrated by the example of molecular structures, but shape is a completely general concept, not restricted just to molecules.

A couple of extensions that can be considered are using values that are not 1 or 0 at each lattice point, and comparing other 3-dimensional properties. The first is that rather than represent each lattice point as a single bit, it can be given a set of bits, i.e., as described above when considering the comparison of properties such as activities. The vector produced from this lattice is now expanded: for instance, in the example above, if each lattice point is given 8 bits to represent some property at that point, then the bit vector produced will be 8*21*21*21 bits in size. The XOR between two shapes then produces 21*21*21 subvectors (each 8 bits long) which can be scrambled as described above. The reader of this scrambled string will know the difference in shape values at each point but will not know which point that value refers to. However, again as described above, they will be able to calculate the L2 distance. An example of the use of this procedure might be to compare electrostatic fields, i.e., the potential at each point is translated into a bit pattern such that the XOR between two such patterns approximates the difference in potentials at that point.

In these two approaches, a shape array of values or a shape array of bits, can be combined: for example the L1 distance between two molecules' shapes can be calculated at the same time as the L1 or L2 distance between their electrostatic fields. Other fields, such as the spatial distance to types of functional groups typically seen on drug-like molecules, such as hydrogen bond donors and acceptors, could also be compared in this way.

Beyond Comparison of Chemical Fingerprints

The principal feature of secure comparison is to allow information exchange to be limited in ways that are expected. There are examples in human affairs other than chemical similarity that can benefit from the approaches described here. Some have been referenced or described hereinabove by way of example, e.g., comparing salaries, or determining if a bid and a sale price are close. The following Examples present some further illustrations.

Example 5: Comparison of Feature Sets: Trading Players Between Sports Teams

Consider two sports teams interested in trading players. They could just present a list to each other of players they would be willing to let go. However, such information is sensitive. A star player might be very unhappy to find out that he or she is being considered for a trade. Even if the meeting of sides is confidential, once the lists have been exchanged the information can—and probably will—leak. On the other hand, comparing lists has a real value if a good trade can be made. Suppose Team 1 draws up a list of its players in alphabetical order and puts a 0 next to each player it wants to keep but a 1 next to each player it would consider trading. Suppose Team 2 makes a similar list of Team 1's players, and places a 0 for each player they are not interested in and a 1 for each player they might trade for. The vectors would look like this:

Team 1: Four players Team 1 would sell:

| 0 | 0 | 1 | 0 | 0 | 0 | 0 | 1 | 0 | 0 | 0 | 1 | 1 | 0 | 0 |
|---|---|---|---|---|---|---|---|---|---|---|---|---|---|---|

Team 2: Five players Team 2 would consider buying:

| 0 | 0 | 1 | 1 | 0 | 0 | 0 | 1 | 1 | 0 | 1 | 0 | 0 | 0 | 0 |
|---|---|---|---|---|---|---|---|---|---|---|---|---|---|---|

The distance between the two strings, which each Team can discover via ASCUS, is L1=5. However, neither team can tell exactly how many matches there are without one other piece of information, i.e., the number of bits set to "1" in the other teams string. Call this number N for Team 1 and M for Team 2. Then the number of matches is:

$$\text{Matches} = \frac{N + M - L1}{2} \qquad (33)$$

This is simply because every match between bits removes two from the maximum L1 of (M+N). Thus, in the above example, N=4, M=5, L1=5, so there should be two matches, which there are at position three and nine in the list. At this point the teams might consider showing each other their lists. There is still some risk because that star player may be on Team 1's list but was not a hit against Team 2's list. However, the risk is lessened because they know they will have some common ground.

It is worth considering a variant of this exchange. Each side needs to know N and M to calculate the number of bits in common, i.e. the number of matches: this is because of the nature of the XOR operation, which determines the number of differences between the bitstrings, not the number of bits in common. Suppose that the two sides do not want to admit how many bits they each set to "1". Surprisingly, progress can still be made. In the above example, suppose that each side sends back an XOR scrambled string that is twice as big as the one received, where the extra bits come from XORing a string of all 1's against the public, i.e., received string. That is, Team 2 calculates:

| 0 | 0 | 1 | 0 | 0 | 0 | 0 | 0 | 1 | 0 | 0 | 0 | 1 | 1 | 0 | 0 |
|---|---|---|---|---|---|---|---|---|---|---|---|---|---|---|---|
|   |   |   |   |   |   |   |   | XOR |   |   |   |   |   |   |   |
| 1 | 1 | 1 | 1 | 1 | 1 | 1 | 1 | 1 | 1 | 1 | 1 | 1 | 1 | 1 | 1 |
|   |   |   |   |   |   |   |   | = |   |   |   |   |   |   |   |
| 1 | 1 | 0 | 1 | 1 | 1 | 1 | 1 | 0 | 1 | 1 | 1 | 0 | 0 | 1 | 0 |

This string only has a 0 where a bit is set in the incoming string, therefore the total number of bits set is {B−N}, where B is the total number of bits, here equal to sixteen. Team 2 now appends this string to the XOR of their string with the received string and scrambles the two of them together and sends it back to Team 1. L1(extended) that is now reported by Team 1 is:

$$L1(\text{extended}) = (B-N) + L1 \quad (34)$$

From this the number of matches is:

$$\text{Matches} = \frac{B + M - L1(\text{extended})}{2} \quad (35)$$

That is, as Team 2 knows each of the elements on the right hand side of this equation, it now knows the number of matches without Team 1 revealing how many bits it set. However, this obfuscation does not last if ASCUS is being used. That is, if each team knows the number of matches, they can go back to the L1(extended) they reported and calculate how many bits the other side set. The equation for this is just:

$$M = L1(\text{extended}) + 2 * \text{Matches} - B \quad (36)$$

Example 6 Internet-Based Match-Making

One other human emotion that can be involved in information exchange is embarrassment. One of the significant inventions of the Internet has been online dating sites, such as Match.com, Tinder, and others. Such sites typically attempt to match people based on mutual interests, e.g., do they like sports, camping, a particular type of music. However, what frequently aligns people are things they might be embarrassed to share: for instance, which really bad movies they like! Imagine if a participant is given a list of 100 movies that are considered 'guilty pleasures', i.e., movies a person might like but they are not sure they'd like anyone else to know that they like. An example might be schmaltz like "Terms of Endearment," or juvenile humor such as "Harold and Kumar". This is exactly the same problem as that described in Example 5 for two sports teams comparing their rosters: in addition to letting each side know how many movies they selected, the L1 allows two people to discover how many such "guilty pleasures" they both enjoy. If there is a large overlap, there might be a high probability the two people would enjoy each others' company, and with ASCUS this can be done without disclosing which movies the participants chose. Not only is this effective but circumvents the issue with online match-making sites that the service provider knows all.

For a more elaborate example, consider creating a guest list for a party between a set of shy boys and another set of shy girls. None of the boys wants to admit, to another boy and certainly not to any of the girls, as to whether any of them are of interest; vice versa applies from the girls. Each side derives their own set of public and private GM keys and then swaps public keys. Then each boy draws up a vector of 1's and 0's corresponding to girls of interest or not of interest respectively in alphabetical order. They do not share these vectors with each other, since each boy could decrypt the other's vector and tease the owner. Rather, they encrypt their vectors and send them to the girls, knowing the girls cannot decrypt this bitstring. Once all the boys have sent such strings, made in the same order, e.g., with the girls' names in alphabetical order, the girls can abstract the one bit from each string that refers to them. For instance if Abigail is the second girl on the alphabetical list she makes a list of all the encrypted bits that are second in each boys list, forming a encrypted string corresponding to the interest from each boy, again, perhaps, in alphabetical order. Each girl then makes their own string, corresponding to her interest or lack of it in each boy, using the boy's public key and XORs it with the extracted string and scrambles it.

As with the example of sports teams comparing rosters, the item of interest is the number of bits in common, which implies whether there is a potential match. However, as above, the XOR process only tells us about differences, i.e., where one side has a different opinion. The number of bits in common can only be extracted if it is known how many bits each side set. But this is a difficulty: no girl would like to know that no boy was interested in her (and vice versa). Similarly, she might be embarrassed for the boys to know that she was actually interested in none (or all!) of them. This, then, is an example where the extended L1 described above is the perfect solution. If a girl sends an extended string back, as above, to the boys, the L1(extended) that they calculate does not let them know the number of their set interested in her or the number of their set she is interested in, only a number related to the difference in these quantities. Only the girl, who knows how many bits she set, knows the number of matches; but she does not know how many boys wanted to see her. Conversely, the boys do not know how many of them like her or how many of them she liked. If there are no matches the girl may be disappointed but that may be simply because of the eternal verity that the boys who liked her are not the ones she liked: such is life!

In this way, each boy (and each girl) discovers how many matches of 'likes' there are without any information on: (a) how many of the other set do like him (or her); (b) anything about how many of the same set liked any particular girl (or boy); (c) which particular member of the other set liked him (or her).

This particular scheme can be extended to N sets (via N(N−1)/2 pairwise comparisons) to determine if there are any potential matches between each item in the set and any item in any of the other sets, maintaining these three principles.

Example 7: Bidding Systems

A system where either a party can determine if its number is higher, equal or lower than that of another, for instance in determining if a transaction might take place, has already been described (for example, with respect to FIGS. 2, and 3A-3H). The same system can also be used when two or more parties want to bid for an item held by a different party, e.g., an auction. To see how this might work, imagine just two parties are bidding. The bid represents the number that is to be compared. After applying the ASCUS method, each party knows whether its bid is higher or lower than the other's. That bid can then be forwarded to the third party, the seller, and that party can decide if the bid is high enough as previously described. Here the seller's "minimum acceptable price" is usually referred to as the "reserve price".

Some things to note about this process are:
i. All bids are publicly available but in encrypted form. (Having bids be public but encrypted means that they cannot be changed later; but they only have to be encrypted (by their owners) as needed for the process.)
ii. The submission of a "bid" is the equivalent of a "lockbox" having this bid within it. That is, if at the conclusion of the sale the private keys are released for (just) the winning bid, the party having the losing bid is able to check the veracity of the determination of whose bid was actually higher. So, there is no need, if these are the established rules, to attempt to enforce symmetry in ASCUS.
iii. The losing bid needs not be revealed (decrypted).
iv. If the winning bid does not reach the reserve price, no bids have to be revealed.
v. In the case of (iv) there is still the potential need to enforce symmetry; such as if one bidder tricks the other into thinking it is the higher bidder when in fact it is not. This can easily be caught by having the seller check whether the losing bidder actually has an acceptable bid when the winning bidder did not. If the losing bidder does, then the winning bidder was lying. If the losing bidder does not then whether the winning bidder was lying or not is irrelevant: no one wins the auction.

This process can be extended to a multi-party bidding system. The central concept here is to extend the concept of "Is integer (bid) A bigger than integer (bid) B?" to the sorting of a list of integers such that, at the end, everyone in the list knows the rank of their bid without knowing other bids (except in cases of equality of bid). An example of how this could work is shown in FIGS. 8A-8G, described below. The process for ordering bids is simply that each party compares its bid to every other bid and keeps track of how many bids are greater than, equal to, or less than, its bid. At the end of the process each bidder knows its rank (including ties if there are any). The bidder of the highest bid can then check against the reserve price. In this scheme the revealing of winning bids is used to ensure security, i.e., each participant can check the validity of the ordering.

There are variants on how this ordering can be achieved. Even if the ordering is not complete all that is necessary in a single item auction is for there to be a top bidder. This only requires a maximum of (N−1) ASCUS comparisons, where N is the number of bidders, as opposed to the (N−1)*(N−1) to establish the ordering of the list of bids. Similarly, sort algorithms which only depend on item to item comparisons can be written that require of the order of N log N comparisons not N*N. This means that a complete sorting of bids can be made that reduces network traffic (from N*N to N log N comparisons, due to the back and forth of encrypted public bid strings).

Figure 8A:
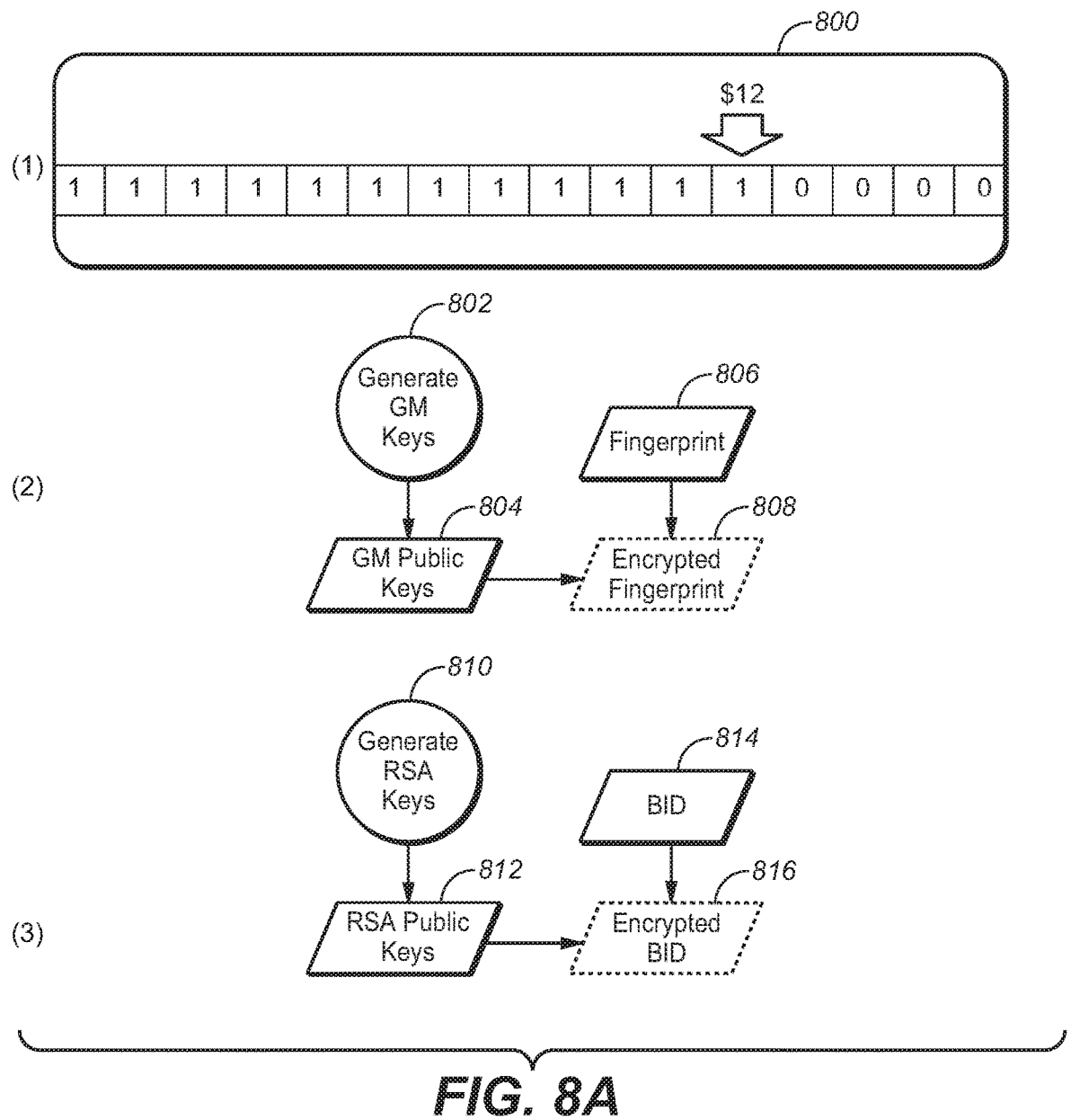
FIGS. 8A-8G show steps in a Public Secure Auction: 8A (steps 1 through 3); 8B (steps 4, and 5); 8C (steps 6 and 7); 8D (steps 8 and 9); 8E (steps 10 and 11); 8F (steps 12-14); and 8G (steps 15-17).
Figure 8B:
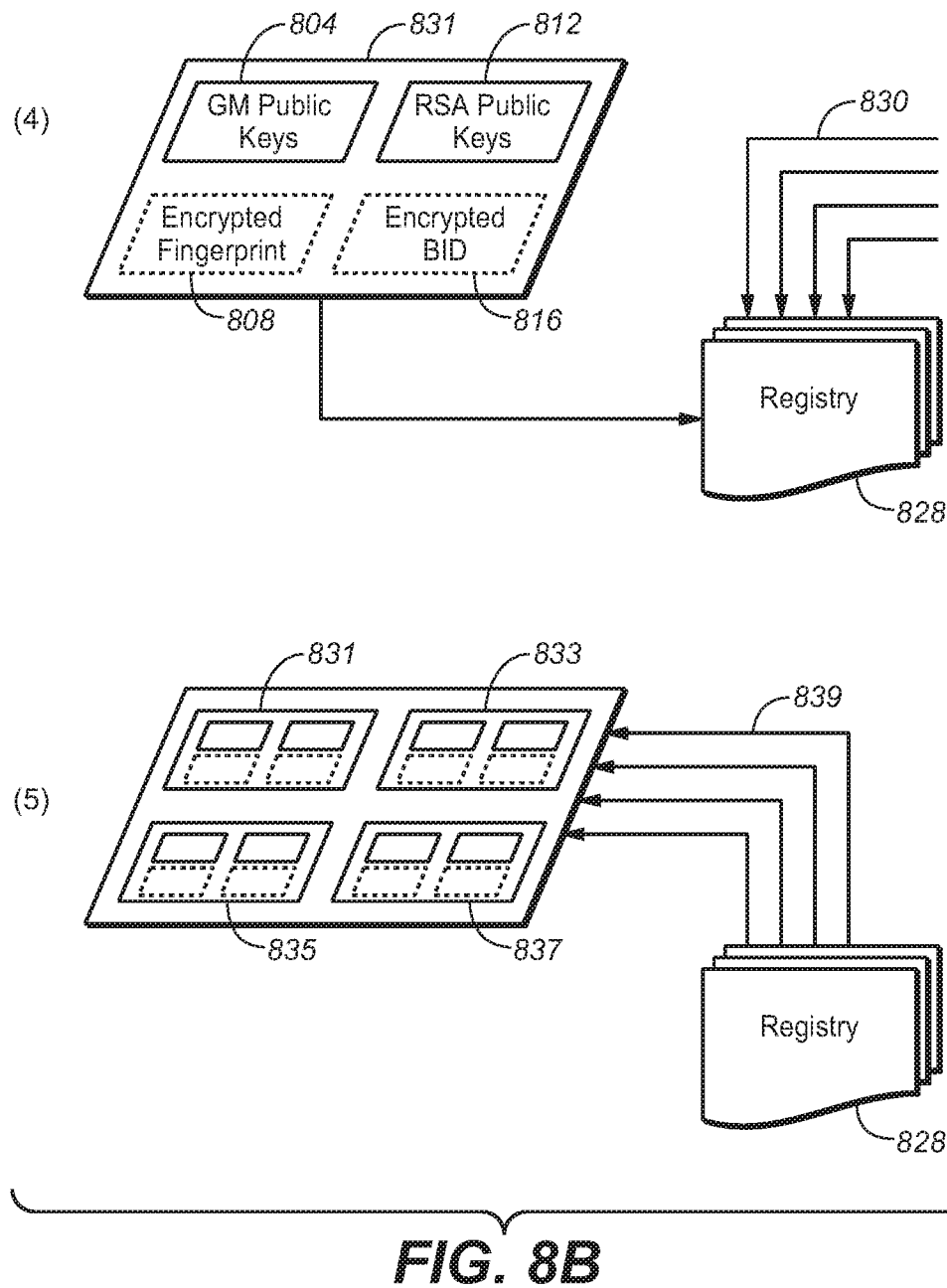
Figure 8C:
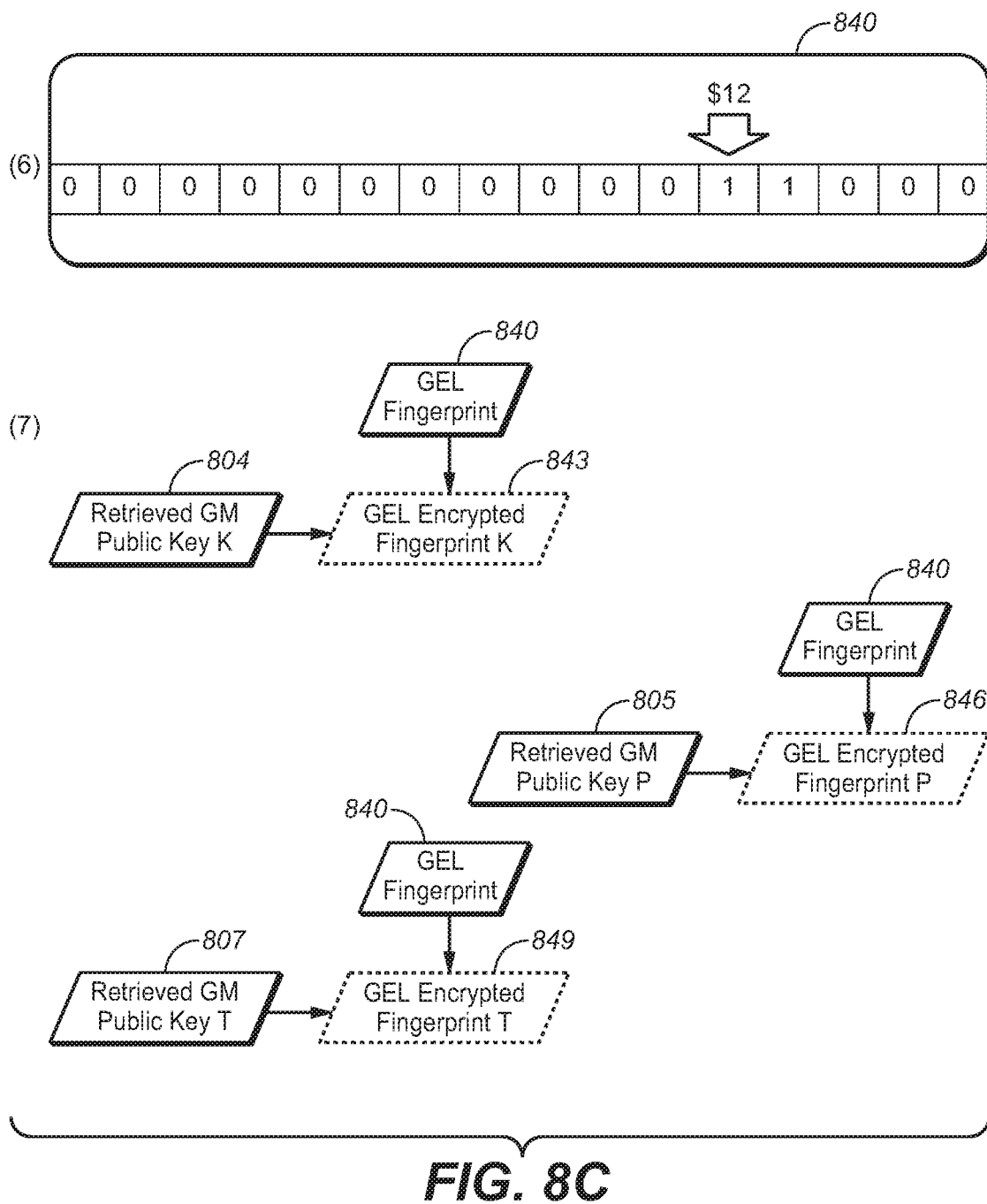
Figure 8D:
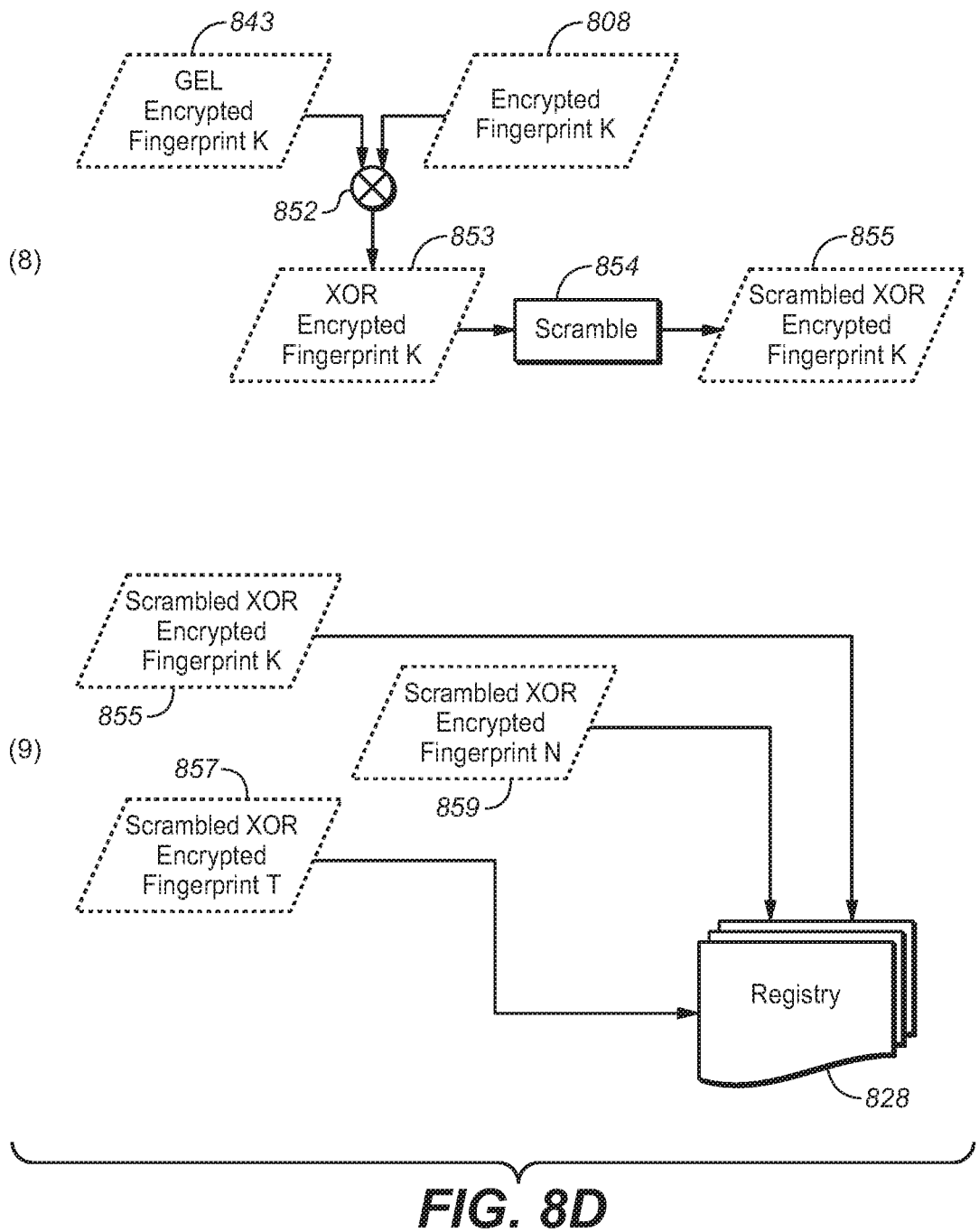
Figure 8E:
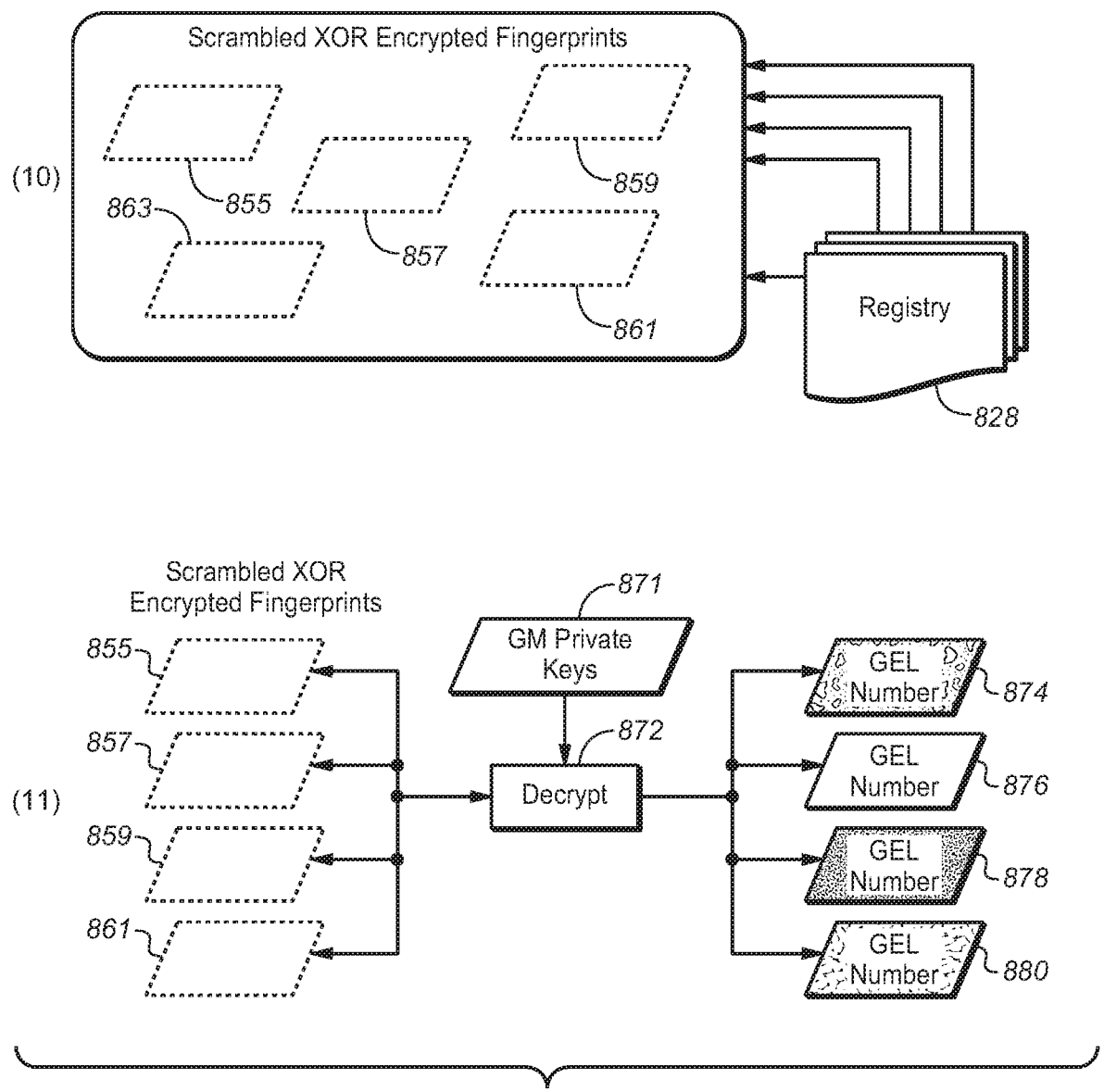
Figure 8F:
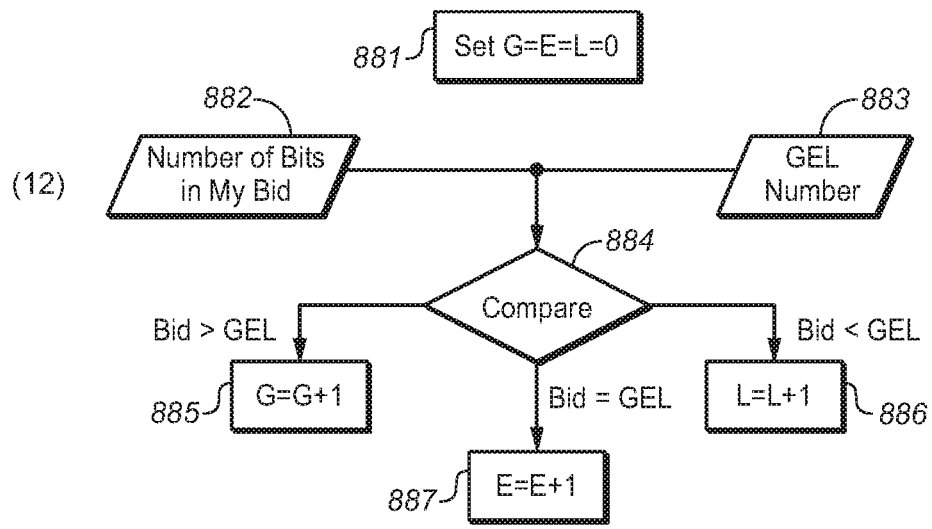
Figure 8F:
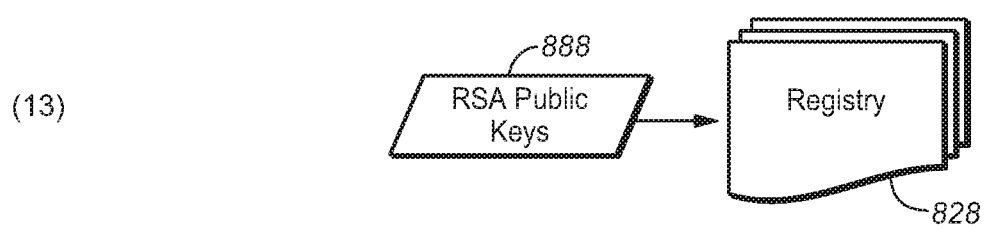
Figure 8G:
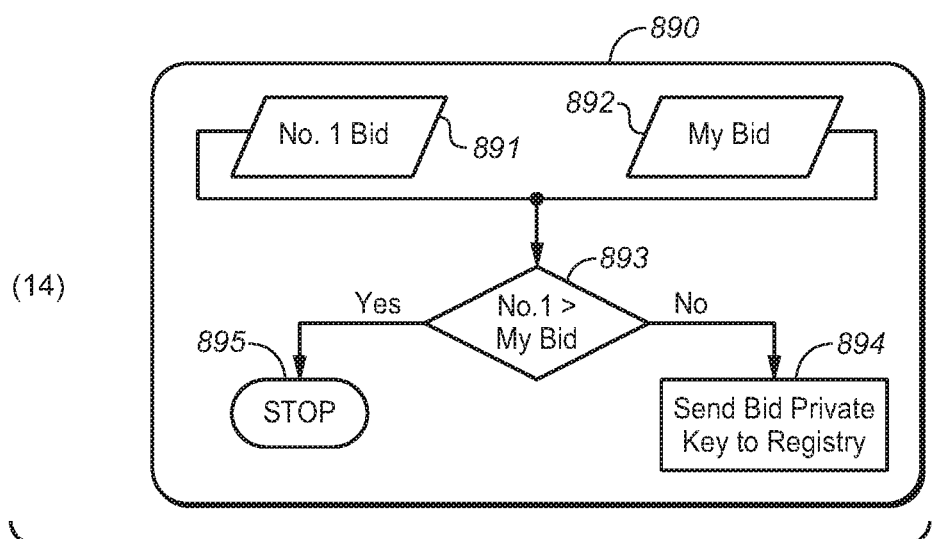

The steps depicted in FIGS. 8A-8G are as follows:
(1) Prepare Bid as fingerprint (800) (FIG. 8A);
(2) Generate GM keys (802), from which GM Public Keys (804) can be derived, and encrypt fingerprint (806) using the public keys to create an encrypted bitstring (808) (FIG. 8A);
(3) Generate RSA Keys (810), from which RSA Public Keys (812) can be derived, and encrypt bid (814) using the RSA public keys, to create an encrypted bid (816) (FIG. 8A);
(4) Send the set (831) of GM Public Keys (804) and encrypted fingerprint (808) and bid files (816) to Registry (828). This is also done for all other bidders (830). (FIG. 8B);
(5) Retrieve (839) all sets (831), (833), (835), (837) of public keys and encrypted files from registry (828) (or to all other bidders) (FIG. 8B);
(6) When all public keys and encrypted files are retrieved, prepare Bid as GEL fingerprint (840) (FIG. 8C);
(7) As illustrated for 3 different bidders, 'K', 'T', and 'P', encrypt GEL Fingerprint (840) with each Retrieved Public key (804), (805), (807), thereby creating GEL encrypted fingerprints (843), (846), (849). (Note that everyone's bid is encrypted with their own keys.) (FIG. 8C);
(8) XOR (852) each encrypted GEL fingerprint with retrieved fingerprint that is encrypted with the same key, to produce an XOR encrypted fingerprint (853). Scramble (854) this fingerprint to produce a scrambled XOR encrypted fingerprint (855). (FIG. 8D, showing example for GEL encrypted fingerprint (843) and retrieved encrypted fingerprint (808));
(9) Send all scrambled, encrypted XOR fingerprints (855), (857), (859) back to the Registry (828) (or to other bidders—not shown) (FIG. 8D);
(10) Retrieve all scrambled, encrypted XOR fingerprints (855), (857), (859), (861), (863) from the Registry (828) (or from other bidders) that are encoded with your public key (FIG. 8E; five fingerprints are shown);
(11) Decrypt (872) each XOR scrambled fingerprint (855), (857), (859), (861) with your GM private key (871), thereby generating GEL Numbers (874), (876), (878), (880) for each respective fingerprint (FIG. 8E; four fingerprints are shown);
(12) Form the {G, E, L} Triplet from all GEL numbers, initially setting G=E=L=0. Compare your bid to everyone else's; now need to figure out what the price is. The number of bits in the bid (882) are compared (884) with the GEL number (883): if the Bid exceeds GEL, the counter G is advanced by 1; if the Bid equals the GEL, counter E is advanced by 1; and if the Bid is lower than the GEL, counter L is advanced by 1. If G=0 (you are the highest bidder) go to (13) to release the keys. (FIG. 8F); the rank of a bid is given by (1+L, E+L+1). E.g., G=9, E=2, L=0, Rank=(1,3) a tie from $1^{st}$ to $3^{rd}$ (meaning that your bid and two others are tied for the top bid position; your bid and two others tying with you occupy positions 1, 2, and 3);

(13) RSA Public Keys (888) for the highest bidder are sent to Registry (828).

(14) If ranked (1, 1) (i.e., unambiguously top ranked) reveal bid private keys by sending them (894) to the Registry; This is a check that one bid is the biggest. Registry (828) can be public. (Box (894) is a challenge to the person claiming to have the highest bid; it is only needed if something is going wrong, such as a challenge to the person claiming to be the highest bidder.)

Finally, there can be public scrutiny of the bids (not shown in FIG. 8), and reporting of mistakes: e.g., if someone claims to have put in a higher bid than the proclaimed winner, then they can prove it by revealing their private keys; if there were no mistakes, the alleged highest bid wins; but if a mistake is verified, the highest ranked bid can be discarded, and step (14) repeated with the next highest bid, etc., until a bid is verified by all, i.e., no one claims to have submitted a higher bid. (The fundamental idea illustrated by this is whether the bidders can rank their bids. The list can be ordered without knowing the values of the bids: because the method shows how to compare pairs, and one can then sort a list using pairwise comparisons.)

Example 8: A Maximum Mutual Happiness (MMH) Stock Exchange

The secure auction described in Example 7 can be extended to the purchase and sale of securities in a very new way. Currently shares are sold or exchanged by one side listing a price and another side deciding if they want to meet that price. However, this is a classic example of a first mover advantage, i.e., the buyer knows what the seller expects and is not going to pay more than that price. The seller can only ever get the price they list: there is no "upside" for the seller, only for the buyer. Furthermore, sales are not made on a one on one basis: typically an intermediate broker is needed. As a consequence, there is the opportunity for "arbitrage", i.e., if the broker knows there is a difference between what a buyer is willing to pay and what a seller is willing to accept they can buy from the seller and sell to the buyer, pocketing the difference—this is the essence of "front-running" that features heavily in the profits from high-speed flash-trading meaning that small investors are at a disadvantage to larger operators. Described in this example is a system that removes all of these problematic aspects of stock trading.

Single Seller

Consider if a seller of a security has 1,000 shares to sell. They record their sell price as an encrypted sell order (i.e., as an ASCUS string) with the exchange, along with their public keys, thus establishing a lockbox for their price, i.e. it can later be decrypted at the behest of the seller but cannot be changed. Bid increments and the number of bits in the bitstring can be established by the seller or by general accord.

Next, a series of bids is registered with the exchange, as well as the number of shares at that price that the buyer is interested in acquiring.

There follows an ASCUS ordering of the bids as described in Example 7, above.

The top bid is compared to the encrypted sell price by the usual ASCUS process, as described elsewhere herein. If the top bid is greater than or equal to the sale price then a sale is, by contract, guaranteed. The buyer reveals his or her private keys for that bid (he or she may have made more than one); the seller reveals his or hers. If the buyer wants to buy more than 1,000 shares only a part of that order is fulfilled, and the auction ends. If the buyer wants to buy fewer than 1,000 shares, then only a part of the seller's order is fulfilled. The price the buyer pays is the average of the seller's price and the bid (the MMH principle). If there are remaining shares, these are then passed to the next highest bidder whose bid is compared to that of the selling price by ASCUS. If the bid is larger (or equal) to the selling price, and if that bidder has recorded an order size greater than that of the remaining shares, the auction ends. The price the second bidder pays is the average of their bid and the sell price. This process continues until the occurrence of the first one of either (a) all the shares of the seller are sold, or (b) all buyers with a bid larger than or equal to the sell prices have had their orders filled. When either of these conditions is satisfied, all sales are made public and the opportunity for challenges based on recorded bids are made. If there are no challenges the auction is considered closed.

If, as bids are traversed from highest to lowest, there are tied bids, this is dealt with simply by giving each bidder equal numbers of shares at their price from the remaining shares, with any left over being allocated by random draw. For instance, if the top two bids want 600 shares each, they each get 500 from the 1,000 on offer. If one bid is for 10 and the other for 2,000 then the first gets 10 and the second gets 990. If there are three equal bids each greater than 333 then each gets 333 with the remaining share going to one of the buyers by random draw.

It is constructive to analyze what has happened here. First, each buyer paid less than (or equal to) their bid and the seller gained more than (or equal) to their sell price. Secondly, there is no "middle-man" taking advantage of price differentials: the benefits of such all go to the buyer and seller equally. An exchange can make money by a standard sale percentage, as in typical auction, or by the more progressive process of taking a percentage of the "happiness", i.e., the difference in buy and sales prices: essentially taking a fraction of the arbitrage while the majority goes to the participants. Thirdly, there is no advantage to being big or small, fast or slow. All bids are considered and filled in the order in which produces the greatest happiness to the participants.

Multiple Sellers

If there are multiple sales prices on offer, each with multiple share allocations this can similarly be handled. The only difference is that the sale prices are also, first, subject to an ASCUS ordering. Thereafter the auction proceeds as usual for the lowest sales price. When this order is completed the process moves on to the next lowest sales price, etc. The auction concludes when there are no buy bids that are greater than any sales price, or when all sales orders are filled, or when all buy orders are completed. For both single and multiple seller exchanges there can, of course, be subsequent sales auctions for unsold shares.

When there are multiple sellers there is the question of who sets the price increment and number of bits (sales range). This can be achieved by each seller requesting an increment and range and the exchange using the combination of smallest increment and largest range, or by the exchange setting "policy". As this is also a comparison of numbers this can also be achieved by using ASCUS, i.e., if the desire is to have a completely decentralized exchange, the smallest step size can be determined by using ASCUS to find the smallest increment suggested by all sellers and, similarly, by finding the largest range, increments for both being determined by general policy.

Example 9: Price Negotiation as Implemented on Mobile Devices

Price negotiation, in which two (or more) parties are interested in exchanging goods or services in return for some form of compensation (usually money), can be implemented according to methods described elsewhere herein, but on mobile technology platforms. Commonly, on entering into a negotiation each party generally has a number in mind beyond which they will not go, referred to herein as the "no go" number for the transaction. This "no go" number is a closely guarded secret in this process, as a result of which, a lot of effort is wasted in negotiating deals that will never be a "go" because the parties' "no go" numbers are incompatible with a successful transaction. In these situations (which could informally be called "nogotiations"), it is in the interest of both parties to walk away as soon as possible.

This example describes a method to enable two (or more) parties to determine if a potential transaction is possible, given all the parties' "no go" constraints, without having to reveal those constraints to any other party. Using the ASCUS methodology, all parties can specify their constraints in an encrypted fashion so that it is possible to determine if a buyer's maximum price exceeds a seller's minimum price.

As a practical matter, this process will require some reasonable amount of computational resources for each party in the transaction. For this reason the following models are applicable:

Direct Peer-to-Peer Negotiation

In this model each party has access to a computing device (cell phone, mobile device, tablet, laptop, PC, etc.) with direct or wireless networking capabilities. Installed on each device is a Negotiation Application ("NA") or service. When activated, the NA may present itself as discoverable on one or more of the available networks as well as search those networks for other instances of discoverable NA's.

Assuming one party is able to identify a desired counterpart through the NA, the initiating party (the "Initiator") may then send an invitation to the counterpart (the "Receiver") through the NA. If the Receiver accepts the invitation, the negotiation process can begin.

Alternatively, an NA could operate in a non-discoverable fashion, in which case the Initiator can send an invitation to a desired counterpart through other means (such as e-mail or text message). The invitation will provide the Receiver with the necessary information to connect back to the NA via the appropriate network. Assuming the Receiver accepts this invitation and connects his/her NA to the Initiator's NA via some type of mutual networking connection, the nogotiation process can begin.

Depending on the networking capabilities supported, this process can take place in-person or remotely. But in both cases, each party has access to their own device to ensure a minimum level of security.

Once a nogotiation between two NA's begins, it uses the following process:

At this point, the "Initiator" indicates what type of transaction the party is interested in (buy, sell, barter, etc.) and what the minimum unit of exchange ("MUE") will be. The MUE determines the currency of the exchange and how finely grained the "no go" values are (e.g., +/−$1 vs. +/−$1M). This information might also be indicated in the initial invitation.

Each party enters their "no go" number into their own NA.

Using the ASCUS methodology, the NA's are able to encrypt their "no go" numbers and determine whether or not a deal is possible.

Once the computation is completed on each device, the "go" or "no go" answer is presented to both parties, at which point they can choose to walk away or begin actual negotiations in good faith that a compromise is attainable.

Direct Peer-to-Peer Nogotiation with Commitment

The first model described above can provide significant value to two (or more) parties hoping to engage in a transaction (regardless of the outcome). However, assuming that the initial nogotiation process indicates that a transaction is possible, standard negotiation tactics are still required. A modification is a model to simplify and expedite these transactions while ensuring that each party achieves Mutually Optimal Pricing (MOP). Mutually optimal pricing is achieved by disclosure of the original "no go" numbers, and then splitting the difference between the two. This ensures that both buyer and seller achieve a price that is better than they would have accepted at the end of the negotiations, and achieves the result quickly and without the emotional impact of confrontational negotiation tactics.

In order to make this process effective, each party needs to commit to completing the transaction under these terms before performing the initial nogotiation. This commitment is obtained through the NA by requiring the completion of a legal contract with the other party. This can be accomplished by means of digital signature or other legally acceptable and binding means. Depending on the potential size of the transaction, the NA may also require the provision of personal electronic banking (e.g., PayPal, Google Wallet) information at the same time to ensure that the funds may be transferred directly upon completion of the nogotiation. If direct funds transfer is not possible, the NA can provide the parties with the appropriate purchase order/invoices as necessary.

As a broker to this transaction, the NA can collect a fee for the transaction that is either a flat fee, a percentage of the total transaction, or a percentage of the difference between the two "no go" numbers thus ensuring that the fees for the transaction don't affect the achievement of the MOP for the two parties. This fee can be collected within the NA through a variety of means depending on the implementation of the NA including direct credit card charge, EFT, PayPal or other digital means, in-app charge via iTunes, Google Play, Amazon Marketplace, etc.

While MOP is theoretically optimal for any given individual transaction, it may not be optimal for large businesses selling commodities for which the seller's minimum price may not change with frequency (e.g., car dealerships) and disclosure of that through the completion of a sale may be damaging to its business. In this situation, the NA's can take steps to prevent the actual prices being shown to the user in the process and simply report the final transaction price (minus transaction fees). Of course, if the function to reach the MOP is known, the original "no go" prices can be determined from that. To avoid this eventuality, the NA can alternatively select a Mutually Beneficial Price (MBP) that is between the "no go" prices, but not necessarily half-way between the prices, using a wide variety of means from simple random selection of the price, to using a highly variable fee percentage, to additional and more sophisticated methods.

All references cited herein are incorporated by reference in their entireties.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the spirit or scope of the appended claims. It is further to be understood that the appended claims are representative of several of the various embodiments described herein, and that any embodiment so described but not expressed in one of the appended claims may be expressed in a claim in an application claiming benefit of priority to the instant application without any concomitant loss of priority.

What is claimed:

1. A method of calculating a level of similarity of a first piece of data from a first party to a second piece of data from a second party without revealing the first and second pieces of data themselves, the method comprising:
   creating, with a first device, a first fingerprint from a first piece of data, wherein the first fingerprint is a bit string that that represents one of more properties associated with the first piece of data;
   generating a GM key with a public key& and private key;
   encrypting the first fingerprint with the public key& to create an encrypted first fingerprint;
   sending the public key to the second device, wherein the second device encrypts a second fingerprint of the second piece of data with the public key to create an encrypted second fingerprint;
   sending the encrypted first fingerprint to the second device, wherein the second device generates a scrambled encrypted fingerprint XOR from at least the encrypted first fingerprint and the encrypted second fingerprint;
   receiving, with the first device, the scrambled encrypted fingerprint XOR to the first party;
   decrypting the scrambled encrypted fingerprint XOR using the private key; and
   determining a similarity in the scrambled fingerprint XOR, thereby learning the level of similarity between the first and second fingerprints.

2. The method of claim 1, wherein the second device generates the scrambled encrypted fingerprint XOR by performing an XOR operation on the encrypted first fingerprint and the encrypted second fingerprint, thereby creating an encrypted fingerprint XOR and scrambling the encrypted fingerprint XOR to create a scrambled encrypted fingerprint XOR.

3. The method of claim 1, wherein the determining of the similarity between the first and second fingerprints comprises:
   counting the number of bits in the scrambled fingerprint XOR.

4. The method of claim 1, wherein the first and second parties are using mobile computing devices.

5. The method of claim 1 wherein the first and second pieces of data each comprise one or more molecular structures encoded digitally.

6. The method of claim 1, wherein the first and second fingerprints each include one or more bits that represent activity of a molecule in an assay.

7. The method of claim 1, wherein the first and second fingerprints each include one or more bits that encode a three dimensional shape of a molecule.

8. The method of claim 1, wherein the scrambling of a fingerprint comprises introducing a random bit padding.

9. A computer apparatus configured to accept and act on input from a first party and a second party, the apparatus comprising:
   one or more computing devices, each of which is equipped with a memory, a user interface, a data storage medium, a network interface, and a processing unit, in communication with one another,
   wherein each of the one or more processing units is configured to execute instructions for calculating a level of similarity between a first piece of data received from the first party and a second piece of data received from the second party without revealing the first and second pieces of data themselves, the instructions comprising:
      an instruction to create, with a first device, a first fingerprint from a first piece of data, wherein the first fingerprint is a bit string that that represents one of more properties associated with the first piece of data;
      an instruction to generate a GM key with an associated public key and private key;
      an instruction to encrypt the first fingerprint with the public key to create an encrypted first fingerprint;
      an instruction to send the public key to the second device, wherein the second device encrypts a second fingerprint of the second piece of data with the public key to create an encrypted second fingerprint;
      an instruction to send the encrypted first fingerprint to the second device, wherein the second device generates a scrambled encrypted fingerprint XOR from at least the encrypted first fingerprint and the encrypted second fingerprint;
      an instruction to receive with the first device, the scrambled encrypted fingerprint XOR to the first party;
      an instruction to decrypt the scrambled encrypted fingerprint XOR using the private key; and
      an instruction to determine a similarity in the scrambled fingerprint XOR, thereby learning the level of similarity between the first and second fingerprints.

10. A method of comparing a first piece of data from a first party and a second piece of data from a second party without revealing the first and second pieces of data themselves, the method comprising:
   creating, with a first device, a first fingerprint from a first piece of data, wherein the first fingerprint is a bit string that that represents one of more properties associated with the first piece of data;
   generating a GM key with an associated public key and private key;
   encrypting the first fingerprint with the public key to create an encrypted first fingerprint;
   uploading the encrypted first fingerprint to a first cloud account;
   sending the public key to the second device, wherein the second device encrypts a second fingerprint of the second piece of data with the public key to create an encrypted second fingerprint and the second device uploads the encrypted second fingerprint to a second cloud account;
   allowing access to the encrypted first fingerprint to the second cloud account, wherein the second cloud account generates a scrambled encrypted fingerprint XOR from at least the encrypted first fingerprint and the encrypted second fingerprint;
   receiving, with the first device, access to the scrambled encrypted fingerprint XOR for the first cloud account;

evaluating the number of hits that are turned on in the scrambled encrypted fingerprint XOR using the private key;

storing this number in encrypted form on the first cloud account;

downloading the encrypted result from the first cloud account; and decrypting the encrypted result to determine the level of similarity between the first and second fingerprints.

11. The method of claim 10, wherein the second device generates the scrambled encrypted fingerprint XOR by performing an XOR operation on the encrypted first fingerprint and the encrypted second fingerprint, thereby creating an encrypted fingerprint XOR and scrambling the encrypted fingerprint XOR to create a scrambled encrypted fingerprint XOR.

12. The method of claim 10, wherein the first and second parties are using mobile computing devices.

13. The method of claim 10, wherein the first and second pieces of data each comprise one or more molecular structures encoded digitally.

14. The method of claim 10, wherein the first and second fingerprints each include one or more bits that represent activity of a molecule in an assay.

15. The method of claim 10, wherein the first and second fingerprints each include one or more bits that encode a three dimensional shape of a molecule.

16. The method of claim 10, wherein the scrambling of a fingerprint comprises introducing a random bit padding.

17. A computer apparatus configured to accept and act on input from a first party and a second party, the apparatus comprising:

one or more computing devices, each of which is equipped with a memory, a user interface, a data storage medium, a network interface, and a processing unit, in communication with one another, wherein each of the one or more processing units is configured to execute instructions for comparing a first piece of data received from the first party and a second piece of data received from the second party without revealing the first and second pieces of data themselves, the instructions comprising:

an instruction to create, with a first device, a first fingerprint from a first piece of data, wherein the first fingerprint is a bit string that that represents one of more properties associated with the first piece of data;

an instruction to generate a GM key with an associated public key and private key;

an instruction to encrypt the first fingerprint with the public key to create an encrypted first fingerprint;

an instruction to upload the encrypted first fingerprint to a first cloud account;

an instruction to send the public key to the second device, wherein the second device encrypts a second fingerprint of the second piece of data with the public key to create an encrypted second fingerprint and the second device uploads the encrypted second fingerprint to a second cloud account;

an instruction to allow access to the encrypted first fingerprint to the second secure cloud account, wherein the second secure account generates a scrambled encrypted fingerprint XOR from at least the encrypted first fingerprint and the encrypted second fingerprint;

an instruction to receive, with the first device, access to the scrambled encrypted fingerprint XOR for the first cloud account;

an instruction to evaluate the number of bits that are turned on in the scrambled encrypted fingerprint XOR using the private key;

an instruction to store this number in encrypted form on the first cloud account;

an instruction to download the encrypted result from the first cloud account; and an instruction to decrypting the encrypted result to determine the level of similarity between the first and second fingerprints.

* * * * *

UNITED STATES PATENT AND TRADEMARK OFFICE
CERTIFICATE OF CORRECTION

PATENT NO. : 11,032,255 B2
APPLICATION NO. : 16/378403
DATED : June 8, 2021
INVENTOR(S) : Anthony Nicholls It is certified that error appears in the above-identified patent and that said Letters Patent is hereby corrected as shown below:

On the Title Page

In item (73), please delete "OpenEye Scientific, Inc." and insert --OpenEye Scientific Software, Inc.--

Signed and Sealed this
Fourth Day of July, 2023

Katherine Kelly Vidal
*Director of the United States Patent and Trademark Office*